United States Patent [19]
Schediwy et al.

[11] Patent Number: 5,861,583
[45] Date of Patent: Jan. 19, 1999

[54] OBJECT POSITION DETECTOR

[75] Inventors: Richard R. Schediwy, Union City; Jeffrey O. Pritchard, San Francisco; Ting Kao, Cupertino; Timothy P. Allen, Los Gatos; John C. Platt, Fremont, all of Calif.

[73] Assignee: Synaptics, Incorporated, San Jose, Calif.

[21] Appl. No.: 680,127

[22] Filed: Jul. 15, 1996

Related U.S. Application Data

[63] Continuation-in-part of Ser. No. 623,483, Mar. 28, 1996, which is a continuation-in-part of Ser. No. 320,158, Oct. 7, 1994, Pat. No. 5,543,591, which is a continuation-in-part of Ser. No. 300,387, Sep. 2, 1994, abandoned, which is a continuation-in-part of Ser. No. 115,743, Aug. 31, 1993, Pat. No. 5,374,787, which is a continuation-in-part of Ser. No. 895,934, Jun. 8, 1992, abandoned.

[51] Int. Cl.$^6$ .............................. G08C 21/00; G09G 5/00
[52] U.S. Cl. .................................... 178/18.06; 178/18.01; 178/18.03; 345/173
[58] Field of Search .............................. 178/18.01, 18.03, 178/18.06; 345/173, 174, 179

[56] References Cited

U.S. PATENT DOCUMENTS

| Re. 23,030 | 8/1948 | Holt . |
| 2,219,497 | 10/1940 | Stevens et al. . |

(List continued on next page.)

FOREIGN PATENT DOCUMENTS

| 0 187 372 | 12/1985 | European Pat. Off. | .......... G01B 7/00 |
| 0 394 614 | 10/1990 | European Pat. Off. | ......... G06F 3/033 |
| 0 490 001 | 6/1992 | European Pat. Off. | ......... G06F 3/033 |
| 0 574 213 | 12/1993 | European Pat. Off. | ....... G06K 11/16 |
| 0 589 498 | 3/1994 | European Pat. Off. | ....... G06K 11/16 |
| 0 609 021 | 8/1994 | European Pat. Off. | ....... G06K 11/16 |
| 2 662 528 | 5/1990 | France | ............ G06K 11/16 |

(List continued on next page.)

OTHER PUBLICATIONS

"Pressure–Sensitive Icons", IBM Technical Disclosure Bulletin, Jun. 1990, vol. 33, No. 1B, pp. 277–278.

"Scroll Control Box", IBM Technical Disclosure Bulletin, Apr. 1993, vol. 36, No. 4, pp. 399–403.

Wilton, Microsoft Windows 3 Developer's Workshop, 1991, pp. 229–230.

(List continued on next page.)

*Primary Examiner*—Vijay Shankar
*Attorney, Agent, or Firm*—D'Alessandro & Ritchie

[57] ABSTRACT

An object proximity sensor includes a capacitive touch-sensitive transducer including row conductive lines insulated from column conductive lines to from a matrix. An insulating layer is disposed over the matrix and has a thickness selected to achieve significant capacitive coupling between an object placed on its surface and the matrix. Circuitry first drives each of the row conductive lines to a fixed voltage and then simultaneously injects a known amount of charge onto each of the row conductive lines, and then senses for each row conductive line a row-sense voltage created by the known amount of charge injected onto each of the row conductive lines, and, simultaneous with injected the known amount of charge, changes the voltage on all of the column conductive lines in the same direction as the row-sense voltage by an amount no greater than about twice the difference between the fixed voltage and an average of all row-sense voltage in the transducer. Circuitry first drives each of the column conductive lines to a fixed voltage and then simultaneously injects a known amount of charge onto each of the column conductive lines, and then senses for each column conductive line a column-sense voltage created by the known amount of charge injected onto each of the column conductive lines, and, simultaneous with injecting the known amount of charge, changes the voltage on all of the row conductive lines in the same direction as the column-sense voltages by an amount no greater than about twice the difference between the fixed voltage and an average of all column-sense voltages in the transducer. A set of object-sensed electrical signals related to all of the row-sense voltages and all of the column-sense voltages is produced.

21 Claims, 11 Drawing Sheets

U.S. PATENT DOCUMENTS

| | | |
|---|---|---|
| 3,128,458 | 4/1964 | Romero . |
| 3,207,905 | 9/1965 | Bray . |
| 3,244,369 | 4/1966 | Nassimbene . |
| 3,401,470 | 9/1968 | Gaven . |
| 3,437,795 | 4/1969 | Kuljian . |
| 3,482,241 | 12/1969 | Johnson . |
| 3,492,440 | 1/1970 | Cerbone et al. . |
| 3,493,791 | 2/1970 | Adelson et al. . |
| 3,497,617 | 2/1970 | Ellis et al. . |
| 3,497,966 | 3/1970 | Gaven . |
| 3,516,176 | 6/1970 | Cleary et al. . |
| 3,522,664 | 8/1970 | Lambright et al. . |
| 3,530,310 | 9/1970 | Adelson et al. . |
| 3,543,056 | 11/1970 | Klein . |
| 3,549,909 | 12/1970 | Adelson et al. ............. 307/252 |
| 3,593,115 | 7/1971 | Dym et al. .................. 323/93 |
| 3,598,903 | 8/1971 | Johnson et al. ............. 178/18 |
| 3,662,378 | 5/1972 | MacArthur ............. 340/347 DD |
| 3,675,239 | 7/1972 | Ackerman et al. ............ 340/365 |
| 3,683,371 | 8/1972 | Holz ......................... 340/365 |
| 3,696,409 | 10/1972 | Braaten ..................... 340/365 |
| 3,732,389 | 5/1973 | Kaelin et al. ............. 200/167 A |
| 3,737,670 | 6/1973 | Larson ....................... 307/116 |
| 3,757,322 | 9/1973 | Barkan et al. ............. 340/365 C |
| 3,760,392 | 9/1973 | Stich ....................... 340/200 |
| 3,773,989 | 11/1973 | Hacon ...................... 200/52 R |
| 3,875,331 | 4/1975 | Halsenbalg ................. 178/19 |
| 3,921,166 | 11/1975 | Volpe ..................... 340/365 C |
| 3,931,610 | 1/1976 | Marin et al. ............. 340/172.5 |
| 3,932,862 | 1/1976 | Graven .................... 340/324 M |
| 3,974,332 | 8/1976 | Abe et al. ................. 178/18 |
| 3,992,579 | 11/1976 | Dym et al. .................. 178/18 |
| 3,999,012 | 12/1976 | Dym ......................... 178/18 |
| 4,056,699 | 11/1977 | Jordan ....................... 200/5 A |
| 4,058,765 | 11/1977 | Richardson et al. ........ 324/61 R |
| 4,071,691 | 1/1978 | Pepper, Jr. ................. 178/19 |
| 4,087,625 | 5/1978 | Dym et al. .................. 178/19 |
| 4,103,252 | 7/1978 | Bobick ...................... 331/48 |
| 4,129,747 | 12/1978 | Pepper, Jr. ................. 178/19 |
| 4,148,014 | 4/1979 | Burson ...................... 340/709 |
| 4,177,354 | 12/1979 | Mathews ..................... 178/18 |
| 4,177,421 | 12/1979 | Thornburg ................. 324/61 R |
| 4,198,539 | 4/1980 | Pepper, Jr. ................. 178/18 |
| 4,221,975 | 9/1980 | Ledniczki et al. ............ 307/116 |
| 4,224,615 | 9/1980 | Penz ........................ 340/712 |
| 4,246,452 | 1/1981 | Chandler .................... 200/5 A |
| 4,257,117 | 3/1981 | Besson ....................... 368/69 |
| 4,264,903 | 4/1981 | Bigelow ................... 340/365 C |
| 4,281,323 | 7/1981 | Burnett et al. .............. 340/712 |
| 4,290,052 | 9/1981 | Eichelberger et al. ....... 340/365 C |
| 4,290,061 | 9/1981 | Serrano ..................... 340/712 |
| 4,291,303 | 9/1981 | Cutler et al. ............... 340/711 |
| 4,293,734 | 10/1981 | Pepper, Jr. ................. 178/18 |
| 4,302,011 | 11/1981 | Pepper, Jr. ................. 273/85 |
| 4,310,839 | 1/1982 | Schwerdt .................... 340/712 |
| 4,313,113 | 1/1982 | Thornburg .................. 340/709 |
| 4,334,219 | 6/1982 | Paülus et al. ............... 340/712 |
| 4,371,746 | 2/1983 | Pepper, Jr. ................. 178/18 |
| 4,398,181 | 8/1983 | Yamamoto ................. 340/365 S |
| 4,423,286 | 12/1983 | Bergeron .................... 178/18 |
| 4,430,917 | 2/1984 | Pepper, Jr. ................. 84/1.01 |
| 4,442,317 | 4/1984 | Jandrell .................... 178/18 |
| 4,455,452 | 6/1984 | Schuyler .................... 178/18 |
| 4,475,235 | 10/1984 | Graham ...................... 382/3 |
| 4,476,463 | 10/1984 | Ng et al. ................... 340/712 |
| 4,511,760 | 4/1985 | Garwin et al. ............... 178/18 |
| 4,516,112 | 5/1985 | Chen ........................ 340/365 |
| 4,526,043 | 7/1985 | Boie et al. ................ 73/862.04 |
| 4,550,221 | 10/1985 | Mabusth ..................... 178/18 |
| 4,554,409 | 11/1985 | Mitsui et al. ............... 178/19 |
| 4,570,149 | 2/1986 | Thornburg et al. ............ 338/114 |
| 4,582,955 | 4/1986 | Blesser ..................... 178/19 |
| 4,595,913 | 6/1986 | Aubuchon ................... 340/365 |
| 4,616,107 | 10/1986 | Abe et al. .................. 178/18 |
| 4,639,720 | 1/1987 | Rympalski et al. ............ 340/712 |
| 4,672,154 | 6/1987 | Rodgers et al. .............. 178/19 |
| 4,680,430 | 7/1987 | Yoshikawa et al. ............ 178/19 |
| 4,686,332 | 8/1987 | Greanias et al. ............. 178/19 |
| 4,698,461 | 10/1987 | Meadows et al. .............. 178/19 |
| 4,733,222 | 3/1988 | Evans ..................... 340/365 C |
| 4,734,685 | 3/1988 | Watanabe ................... 340/710 |
| 4,736,191 | 4/1988 | Matzke et al. ............. 340/365 C |
| 4,758,690 | 7/1988 | Kimura ..................... 178/19 |
| 4,766,423 | 8/1988 | Ono et al. .................. 340/709 |
| 4,788,385 | 11/1988 | Kimura ..................... 178/19 |
| 4,794,208 | 12/1988 | Watson ...................... 178/19 |
| 4,820,886 | 4/1989 | Watson ...................... 178/19 |
| 4,853,498 | 8/1989 | Meadows et al. .............. 178/19 |
| 4,914,624 | 4/1990 | Dunthorn .................... 364/900 |
| 4,918,262 | 4/1990 | Flowers et al. .............. 178/18 |
| 4,922,061 | 5/1990 | Meadows et al. .............. 178/19 |
| 4,935,728 | 6/1990 | Kley ........................ 340/709 |
| 4,988,982 | 1/1991 | Rayner et al. ............... 340/706 |
| 5,016,008 | 5/1991 | Gruaz et al. ................ 341/33 |
| 5,120,907 | 6/1992 | Shinbori et al. ............. 478/18 |
| 5,149,919 | 9/1992 | Greanias et al. ............. 178/19 |
| 5,194,862 | 3/1993 | Edwards ..................... 341/20 |
| 5,231,450 | 7/1993 | Daniels ..................... 355/27 |
| 5,239,140 | 8/1993 | Kuroda et al. ............... 178/18 |
| 5,270,711 | 12/1993 | Knapp ....................... 341/34 |
| 5,327,161 | 7/1994 | Logan et al. ................ 345/157 |
| 5,365,254 | 11/1994 | Kawamoto ................... 345/157 |
| 5,369,227 | 11/1994 | Stone ....................... 178/18 |
| 5,373,118 | 12/1994 | Watson ...................... 178/19 |
| 5,374,787 | 12/1994 | Miller et al. ............... 178/18 |
| 5,386,219 | 1/1995 | Greanias et al. ............. 345/174 |
| 5,408,593 | 4/1995 | Kotaki et al. ............... 395/122 |
| 5,488,204 | 1/1996 | Mead et al. ................. 345/179 |

FOREIGN PATENT DOCUMENTS

| | | | |
|---|---|---|---|
| 60-205625 | 10/1985 | Japan | G06F 3/03 |
| 62 126429 | 6/1987 | Japan | G06F 3/033 |
| 63 073415 | 4/1988 | Japan | G06F 3/033 |
| 2 040614 | 2/1990 | Japan | G02G 1/133 |
| 4 015725 | 1/1992 | Japan | G06F 3/033 |
| 06 139022 | 5/1994 | Japan | G06F 3/033 |
| 07 072 976 | 3/1995 | Japan | G06F 3/033 |
| 2 139 762 | 11/1984 | United Kingdom | G06F 3/033 |
| 2 266 038 | 10/1993 | United Kingdom | G06F 3/033 |
| 2 288 665 | 4/1995 | United Kingdom | G06K 11/12 |
| 91/03039 | 3/1991 | WIPO | G09G 3/02 |
| 91/05327 | 4/1991 | WIPO | G09G 3/02 |
| 96/07966 | 3/1996 | WIPO | G06F 3/033 |
| 96/11435 | 4/1996 | WIPO | G06F 3/033 |
| 96/18179 | 6/1996 | WIPO | G08C 21/00 |

OTHER PUBLICATIONS

Tiburtius, "Transparente Folientastaturen", Feinwerktechnik & Messtechnik 97, No. 7, Munchen, DE, Jul. 1989, pp. 299–300.

"Double–Click Generation Method for Pen Operations", IBM Technical Disclosure Bulletin, Nov. 1992, vol. 35, No. 6, p. 3.

"Three–Axis Touch–Sensitive Pad", IBM Technical Disclosure Bulletin, Jan. 1987, vol. 29, No. 8, pp. 3451–3453.

Chun, et al., "A High–Performance Silicon Tactile Imager Based on a Capacitive Cell", IEEE Transactions on Electron Devices, Jul. 1985, vol. ED–32, No. 7, pp. 1196–1201.

OBJECT POSITION DETECTOR

RELATED APPLICATIONS

This application is a continuation-in-part of co-pending application Ser. No. 08/623,483, filed Mar. 28, 1996, which is a continuation-in-part of application Ser. No. 08/320,158, filed Oct. 7, 1994, now U.S. Pat. No. 5,543,591, which is a continuation-in-part of application Ser. No. 08/300,387, filed Sep. 2, 1994, now abandoned which is a continuation-in-part of application Ser. No. 08/115,743, filed Aug. 31, 1993, now U.S. Pat. No. 5,374,787, which is a continuation-in-part of application Ser. No. 07/895,934, filed Jun. 8, 1992, now abandoned.

GOVERNMENT LICENSE RIGHTS

The U.S. Government has a paid-up license in this invention and the right in limited circumstances to require the patent owner to license others on reasonable terms as provided for by the terms of contract No. N00014-95-C-0047 awarded by the Office of Naval Research.

BACKGROUND OF THE INVENTION

1. Field Of The Invention

The present invention relates to object position sensing transducers and systems. More particularly, the present invention relates to capacitive object position recognition sensors useful in applications such as cursor movement for computing devices and other applications, and especially to such capacitive object position recognition sensors with reduced susceptibility to background capacitance.

2. The Prior Art

Numerous devices are available or have been proposed for use as object position detectors for use in computer systems and other applications. The most familiar of such devices is the computer "mouse". While extremely popular as a position indicating device, a mouse has mechanical parts and requires a surface upon which to roll its position ball. Furthermore, a mouse usually needs to be moved over long distances for reasonable resolution. Finally, a mouse requires the user to lift a hand from the keyboard to make the cursor movement, thereby upsetting the prime purpose, which is usually typing on the computer.

Trackball devices are similar to mouse devices. A major difference, however is that, unlike a mouse device, a trackball device does not require a surface across which it must be rolled. Trackball devices are still expensive, have moving parts, and require a relatively heavy touch as do the mouse devices. They are also large in size and doe not fit well in a volume-sensitive application like a laptop computer.

There are several available touch-sense technologies which may be employed for use as a position indicator. Resistive-membrane position sensors are known and used in several applications. However, they generally suffer from poor resolution, the sensor surface is exposed to the user and is thus subject to wear. In addition, resistive-membrane touch sensors are relatively expensive. A one-surface approach requires a user to be grounded to the sensor for reliable operation. This cannot be guaranteed in portable computers. An example of a one-surface approach is the UnMouse product by MicroTouch, of Wilmington, Mass. A two-surface approach has poorer resolution and potentially will wear out very quickly in time.

Resistive tablets are taught by U.S. Pat. No. 4,680,430 to Yoshikawa, U.S. Pat. No. 3,497,617 to Ellis and many others. The drawback of all such approaches is the high power consumption and the high cost of the resistive membrane employed.

Surface Acoustic Wave (SAW) devices have potential use as position indicators. However, this sensor technology is expensive and is not sensitive to light touch. In addition, SAW devices are sensitive to residue buildup on the touch surfaces and generally have poor resolution.

Strain gauge or pressure plate approaches are an interesting position sensing technology, but suffer from several drawbacks. This approach may employ piezo-electric transducers. One drawback is that the piezo phenomena is an AC phenomena and may be sensitive to the user's rate of movement. In addition, strain gauge or pressure plate approaches are somewhat expensive because special sensors are required.

Optical approaches are also possible but are somewhat limited for several reasons. All would require light generation which will require external components and increase cost and power drain. For example, a "finger-breaking" infra-red matrix position detector consumes high power and suffers from relatively poor resolution.

There have been numerous attempts to provide a device for sensing the position of a thumb or other finger for use as a pointing device to replace a mouse or trackball. Desirable attributes of such a device are low power, low profile, high resolution, low cost, fast response, and ability to operate reliably when the finger carries electrical noise, or when the touch surface is contaminated with dirt or moisture.

Because of the drawbacks of resistive devices, many attempts have been made to provide pointing capability based on capacitively sensing the position of the finger. U.S. Pat. No. 3,921,166 to Volpe teaches a capacitive matrix in which the finger changes the transcapacitance between row and column electrodes. U.S. Pat. No. 4,103,252 to Bobick employs four oscillating signals to interpolate x and y positions between four capacitive electrodes. U.S. Pat. No. 4,455,452 to Schuyler teaches a capacitive tablet wherein the finger attenuates the capacitive coupling between electrodes.

U.S. Pat. No. 4,550,221 to Mabusth teaches a capacitive tablet wherein the effective capacitance to "virtual ground" is measured by an oscillating signal. Each row or column is polled sequentially, and a rudimentary form of interpolation is applied to resolve the position between two rows or columns. An attempt is made to address the problem of electrical interference by averaging over many cycles of the oscillating waveform. The problem of contamination is addressed by sensing when no finger was present, and applying a periodic calibration during such no-finger-present periods. U.S. Pat. No. 4,639,720 to Rympalski teaches a tablet for sensing the position of a stylus. The stylus alters the transcapacitance coupling between row and column electrodes, which are scanned sequentially. U.S. Pat. No. 4,736,191 to Matzke teaches a radial electrode arrangement under the space bar of a keyboard, to be activated by touching with a thumb. This patent teaches the use of total touch capacitance, as an indication of the touch pressure, to control the velocity of cursor motion. Pulsed sequential polling is employed to address the effects of electrical interference.

U.S. Pat. Nos. 4,686,332 and 5,149,919, to Greanias, teaches a stylus and finger detection system meant to be mounted on a CRT. As a finger detection system, it's X/Y sensor matrix is used to locate the two matrix wires carrying the maximum signal. With a coding scheme these two wires uniquely determine the location of the finger position to the resolution of the wire stepping. For stylus detection, Greanias first coarsely locates it, then develops a virtual dipole by driving all lines on one side of the object in one direction and all lines on the opposite side in the opposite direction. This is done three times with different dipole phases and signal polarities. Assuming a predetermined matrix response to the object, the three measurements present a set of simultaneous equations that can be solved for position.

U.S. Pat. No. 4,733,222 to Evans is the first to teach a capacitance touch measurement system that interpolates to a high degree. Evans teaches a three terminal measurement system that uses a drive, sense and electrode signal set (3 signals) in its matrix, and bases the measurement on the attenuation effect of a finger on the electrode node signal (uses a capacitive divider phenomena). Evans sequentially scans through each drive set to measure the capacitance. From the three largest responses an interpolation routine is applied to determine finger position. Evans also teaches a zeroing technique that allows "no-finger" levels to be canceled out as part of the measurement.

U.S. Pat. No. 5,016,008 to Gruaz describes a touch sensitive pad that also uses interpolation. Gruaz uses a drive and sense signal set (2 signals) in the touch matrix and like Evans relies on the attenuation effect of a finger to modulate the drive signal. The touch matrix is sequentially scanned to read the response of each matrix line. An interpolation program then selects the two largest adjacent signals in both dimensions to determine the finger location, and ratiometrically determines the effective position from those 4 numbers.

Gerpheide, PCT application US90/04584, publication No. WO91/03039, U.S. Pat. No. 5,305,017 applies to a touch pad system a variation of the virtual dipole approach of Greanias. Gerpheide teaches the application of an oscillating potential of a given frequency and phase to all electrodes on one side of the virtual dipole, and an oscillating potential of the same frequency and opposite phase to those on the other side. Electronic circuits develop a "balance signal" which is zero when no finger is present, and which has one polarity if a finger is on one side of the center of the virtual dipole, and the opposite polarity if the finger is on the opposite side. To acquire the position of the finger initially, the virtual dipole is scanned sequentially across the tablet. Once the finger is located, it is "tracked" by moving the virtual dipole toward the finger once the finger has moved more than one row or column.

Because the virtual dipole method operates by generating a balance signal that is zero when the capacitance does not vary with distance, it only senses the perimeter of the finger contact area, rather than the entire contact area. Because the method relies on synchronous detection of the exciting signal, it must average for long periods to reject electrical interference, and hence it is slow. The averaging time required by this method, together with the necessity to search sequentially for a new finger contact once a previous contact is lost, makes this method, like those before it, fall short of the requirements for a fast pointing device that is not affected by electrical interference.

It should also be noted that all previous touch pad inventions that used interpolation placed rigorous design requirements on their sensing pad. Greanias and Evans use a complicated and expensive drive, sense and electrode line scheme to develop their signal. Gruaz and Gerpheide use a two signal drive and sense set. In the present invention the driving and sensing is done on the same line. This allows the row and column sections to be symmetric and equivalent. This in turn allows independent calibration of all signal paths, which makes board layout simpler and less constraining, and allows for more unique sensor topologies.

The shortcomings of the inventions and techniques described in the prior art can also be traced to the use of only one set of driving and sensing electronics, which was multiplexed sequentially over the electrodes in the tablet. This arrangement was cost effective in the days of discrete components, and avoided offset and scale differences among circuits.

The sequential scanning approach of previous systems also made them more susceptible to noise. Noise levels could change between successive measurements, thus changing the measured signal and the assumptions used in interpolation routines.

Finally, all previous approaches assumed a particular signal response for finger position versus matrix position. Because the transfer curve is very sensitive to many parameters and is not a smooth linear curve as Greanias and Gerpheide assume, such approaches are limited in the amount of interpolation they can perform.

In prior co-pending application Ser. No. 08/115,743, filed Aug. 31, 1993, now U.S. Pat. No. 5,734,787, a two-dimensional capacitive sensing system equipped with a separate set of drive/sense electronics for each row and for each column of a capacitive tablet is disclosed. All row electrodes are sensed simultaneously, and all column electrodes are sensed simultaneously. The sensed signals are processed by analog circuitry.

Of the touchpad devices currently available, only the Alps/Cirque GlidePoint includes gesture recognition. The GlidePoint supports basic tap, double-tap, and drag gestures to simulate actions on a primary mouse button. It does not support multiple-finger gestures, nor are there gestures for simulating secondary button clicks. No information is known about the implementation methods employed in the GlidePoint. However, the GlidePoint is known to have difficulty with double-taps, one of the problems addressed by the present invention. The GlidePoint exhibits a hesitation on each finger-motion stroke which may be an attempt to stabilize the cursor during tap gestures. Also, the GlidePoint must rely on physical switches or extremely high gain or acceleration in order to allow drags over long distances.

One touchpad product, the UnMouse, mounts a switch underneath its resistive sensor so that the user simply presses down on the pad to activate the button. Aside from requiring fragile and complex mechanical mounting, this device also is reported to be very tiring to the user.

During use in a humid environment, a capacitive touch sensor can accumulate a thin layer of moisture on its surface. Also, if users of the touch sensor use hand lotion, a thin layer of hand lotion can accumulate on the surface of the touch sensor. Prior art capacitive touch sensor systems will detect the additional transcapacitance due to moisture, hand lotion, etc., as erroneous indicia of object proximity or touch.

It is thus an object of the present invention to provide a two-dimensional capacitive sensing system equipped with a separate set of drive/sense electronics for each row and for each column of a capacitive tablet, wherein all row electrodes are sensed simultaneously, and all column electrodes are sensed simultaneously.

It is a further object of the present invention to provide an electronic system that is sensitive to the entire area of contact of a finger or other conductive object with a capacitive tablet, and to provide as output the coordinates of some measure of the center of this contact area while remaining insensitive to the characteristic profile of the object being detected.

It is a further object of the present invention to provide an electronic system that provides as output some measure of area of contact of a finger or other conductive object with a capacitive tablet.

Yet another object of the present invention is to provide a two-dimensional capacitive sensing system equipped with a separate set of drive/sense electronics for each row and for each column of a capacitive tablet, wherein all row electrodes are sensed simultaneously, and all column electrodes are sensed simultaneously and wherein the information defining the location of a finger or other conductive object is processed in digital form.

It is a further object of the present invention to provide a two-dimensional capacitive sensing system wherein all row electrodes are sensed simultaneously, and all column electrodes are sensed simultaneously and wherein the location of a finger or other conductive object within a peripheral region of a sensing plane can optionally cause cursor "edge motion" on a display screen allowing control of large cursor excursions from a small sensing plane with a single gesture.

A further object of the present invention to provide a two-dimensional capacitive sensing system which cancels out background capacitance effects due to environmental conditions such as moisture.

BRIEF DESCRIPTION OF THE INVENTION

With the advent of very high levels of integration, it has become possible to integrate many channels of driving/sensing electronics into one integrated circuit, along with the control logic for operating them, and the interface electronics to allow the pointing device to communicate directly with a host microprocessor. The present invention uses adaptive analog techniques to overcome offset and scale differences between channels, and can thus sense either transcapacitance or self-capacitance of all tablet rows or columns in parallel. This parallel-sensing capability, made possible by providing one set of electronics per row or column, allows the sensing cycle to be extremely short, thus allowing fast response while still maintaining immunity to very high levels of electrical interference.

The present invention comprises a position-sensing technology particularly useful for applications where finger position information is needed, such as in computer "mouse" or trackball environments. However the position-sensing technology of the present invention has much more general application than a computer mouse, because its sensor can detect and report if one or more points are being touched. In addition, the detector can sense the pressure of the touch.

According to a preferred embodiment of the present invention, referred to herein as a "finger pointer" embodiment, a position sensing system includes a position sensing transducer comprising a touch-sensitive surface disposed on a substrate, such as a printed circuit board, including a matrix of conductive lines. A first set of conductive lines runs in a first direction and is insulated from a second set of conductive lines running in a second direction generally perpendicular to the first direction. An insulating layer is disposed over the first and second sets of conductive lines. The insulating layer is thin enough to promote significant capacitive coupling between a finger placed on its surface and the first and second sets of conductive lines.

Sensing electronics respond to the proximity of a finger, conductive object, or an object of high dielectric constant (i.e., greater than about 5) to translate the capacitance changes of the conductors caused by object proximity into digital information which is processed to derive position and touch pressure information. Its output is a simple X, Y and pressure value of the one object on its surface. In all descriptions herein, fingers are to be considered interchangeable with conductive objects and objects of high dielectric constant.

Different prior art pad scan techniques have different advantages in different environments. Parallel drive/sense techniques according to the present invention allow input samples to be taken simultaneously, thus all channels are affected by the same phase of an interfering electrical signal, greatly simplifying the signal processing and noise filtering.

There are three drive/sense methods employed in the touch sensing technology of the present invention. According to a first embodiment of the invention, the voltages on all of the X lines of the sensor matrix are simultaneously moved, while the voltages of the Y lines are held at a constant voltage, with the complete set of sampled points simultaneously giving a profile of the finger in the X dimension. Next, the voltages on all of the Y lines of the sensor matrix are simultaneously moved, while the voltages of the X lines are held at a constant voltage to obtain a complete set of sampled points simultaneously giving a profile of the finger in the other dimension.

According to a second drive/sense method, the voltages on all of the X lines of the sensor matrix are simultaneously moved in a positive direction, while the voltages of the Y lines are moved in a negative direction. Next, the voltages on all of the X lines of the sensor matrix are simultaneously moved in a negative direction, while the voltages of the Y lines are moved in a positive direction. This technique doubles the effect of any transcapacitance between the two dimensions, or conversely, halves the effect of any parasitic capacitance to ground. In both methods, the capacitive information from the sensing process provides a profile of the proximity of the finger to the sensor in each dimension.

According to a third, and presently preferred, drive/sense method, the voltages on all of the X lines of the sensor matrix are simultaneously moved, while the voltages of the Y lines are simultaneously moved in the same direction by a voltage corresponding to the background capacitance, with the complete set of sampled points simultaneously giving a profile of the finger in the X dimension. Next, the voltages on all of the Y lines of the sensor matrix are simultaneously moved, while the voltages of the X lines are simultaneously moved in the same direction by the voltage corresponding to the background capacitance to obtain a complete set of sampled points simultaneously giving a profile of the finger in the other dimension.

As presently preferred, all of these embodiments then take these profiles and derive a digital value representing the centroid for X and Y position and derive a second digital value for the Z pressure information. The digital information may be directly used by a host computer. Analog processing of the capacitive information may also be used according to the present invention.

The position sensor of these embodiments can only report the position of one object on its sensor surface. If more than one object is present, the position sensor of this embodiment computes the centroid position of the combined set of objects. However, unlike prior art, because the entire pad is being profiled, enough information is available to discern simple multi-finger gestures to allow for a more powerful user interface.

BRIEF DESCRIPTION OF THE DRAWINGS

FIG. 4b is an illustrative schematic diagram of the charge integrator circuit of FIG. 4a.

DETAILED DESCRIPTION OF A PREFERRED EMBODIMENT

This application is a continuation-in-part of co-pending application Ser. No. 08/623,483, filed Mar. 28, 1996, which is a continuation-in-part of co-pending application Ser. No. 08/320,158, filed Oct. 7, 1994, which is a continuation-in-part of co-pending application Ser. No. 08/300,387, filed Sep. 2, 1994, which is a continuation-in-part of application Ser. No. 08/115,743, filed Aug. 31, 1993, now U.S. Pat. No. 5,374,787, which is a continuation-in-part of co-pending application Ser. No. 07/895,934, filed Jun. 8, 1992. The present invention continues the approach disclosed in the parent applications and provides more unique features not previously available. These improvements provide a more easily integrated solution, increased sensitivity, and greater noise rejection, increased data acquisition rate and decreased power consumption. The present invention allows for continuous self calibration to subtract out the effects of environmental changes.

Those of ordinary skill in the art will realize that the following description of the present invention is illustrative only and not in any way limiting. Other embodiments of the invention will readily suggest themselves to such skilled persons.

The present invention brings together in combination a number of unique features which allow for new applications not before possible. Because the object position sensor of the present invention has very low power requirements, it is beneficial for use in battery operated or low power applications such as lap top or portable computers. It is also a very low cost solution, has no moving parts (and is therefore virtually maintenance free), and uses the existing printed circuit board traces for sensors. The sensing technology of the present invention can be integrated into a computer motherboard to even further lower its cost in computer applications. Similarly, in other applications the sensor can be part of an already existent circuit board.

Because of its small size and low profile, the sensor technology of the present invention is useful in lap top or portable applications where volume is an important consideration. The sensor technology of the present invention requires circuit board space for only a single sensor interface chip that can interface directly to a microprocessor, plus the area needed on the printed circuit board for sensing.

Figure 1:
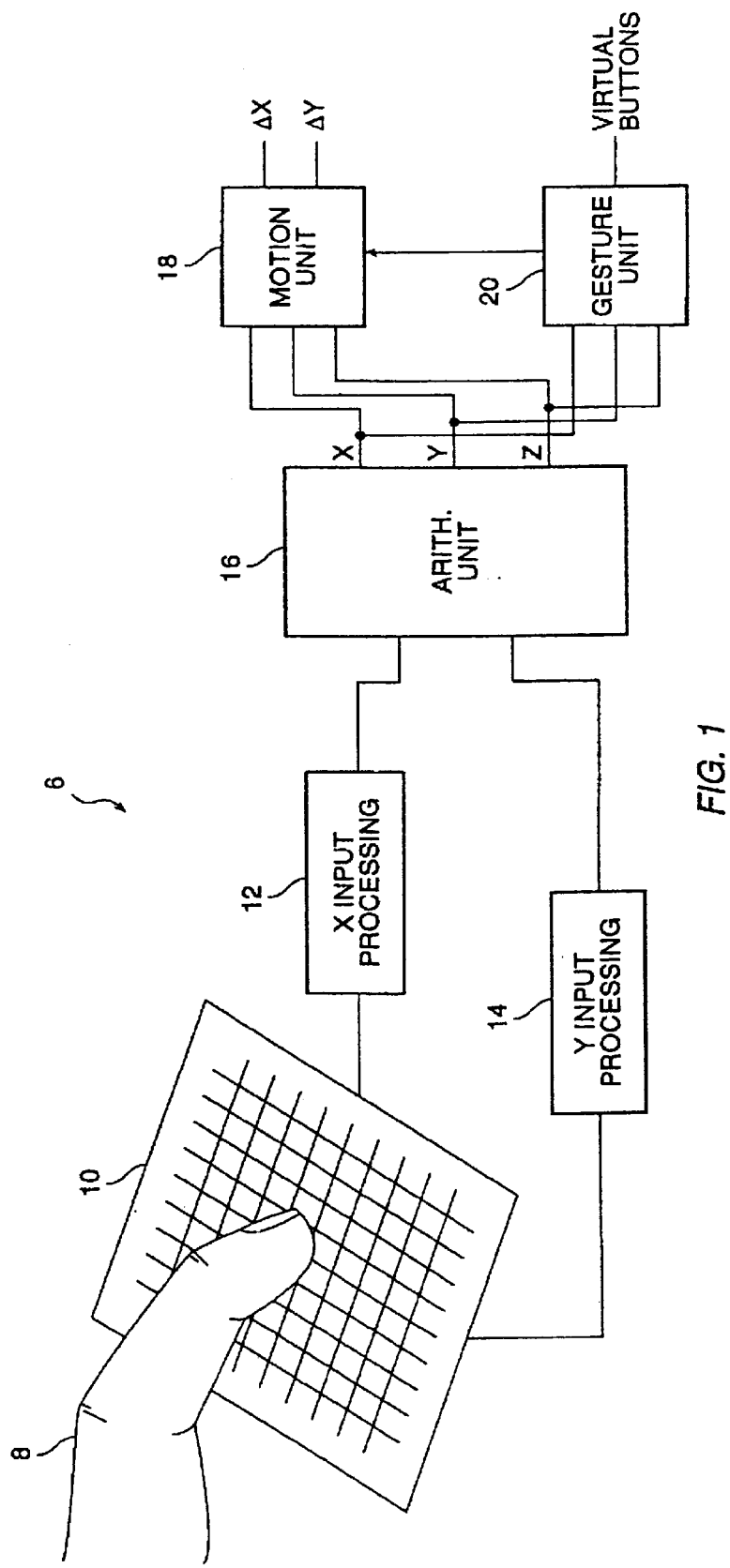
FIG. 1 is an overall block diagram of the capacitive position sensing system of the present invention.
Figure 2A:
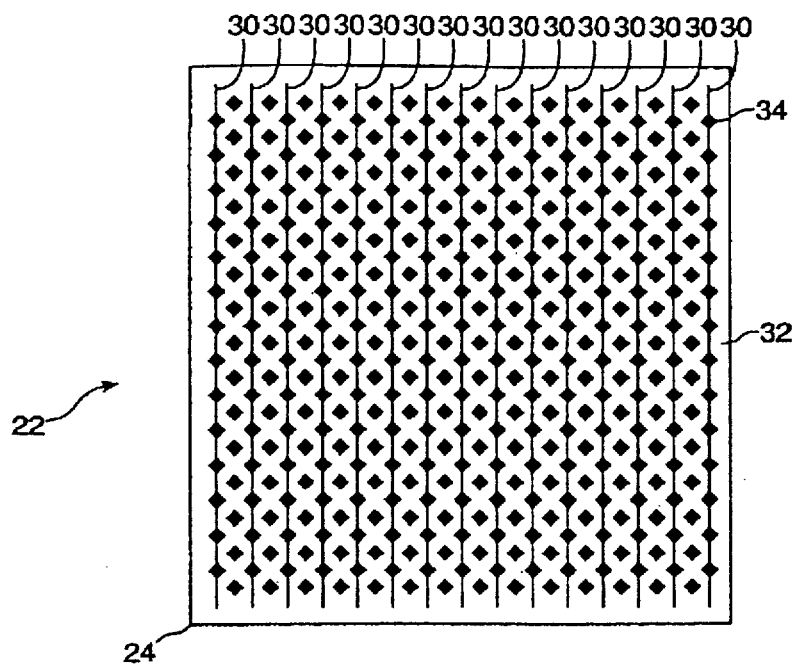
FIG. 2a is a top view of an object position sensor transducer according to a presently preferred embodiment of the invention showing the object position sensor surface layer including a top conductive trace layer and conductive pads connected to a bottom trace layer.
Figure 2B:
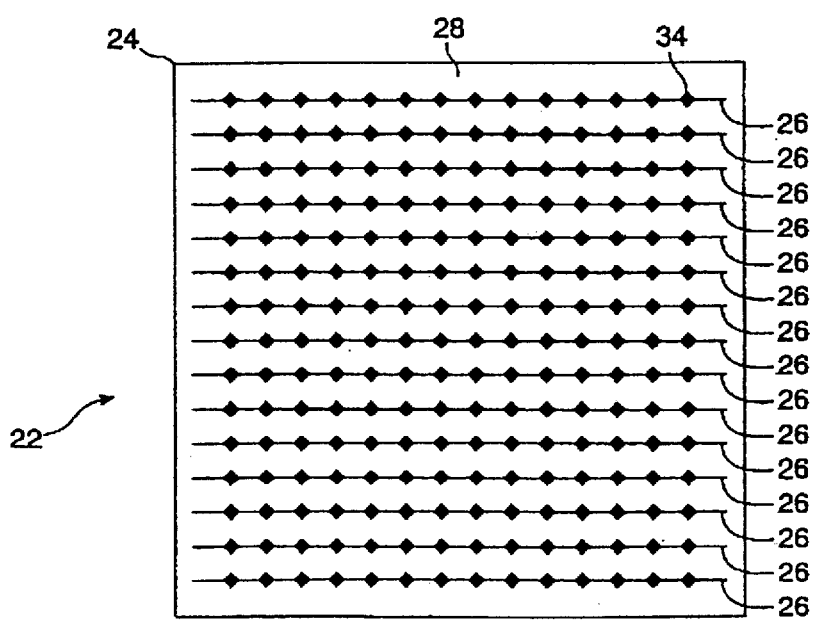
FIG. 2b is a bottom view of the object position sensor transducer of FIG. 2a showing the bottom conductive trace layer.
Figure 2C:
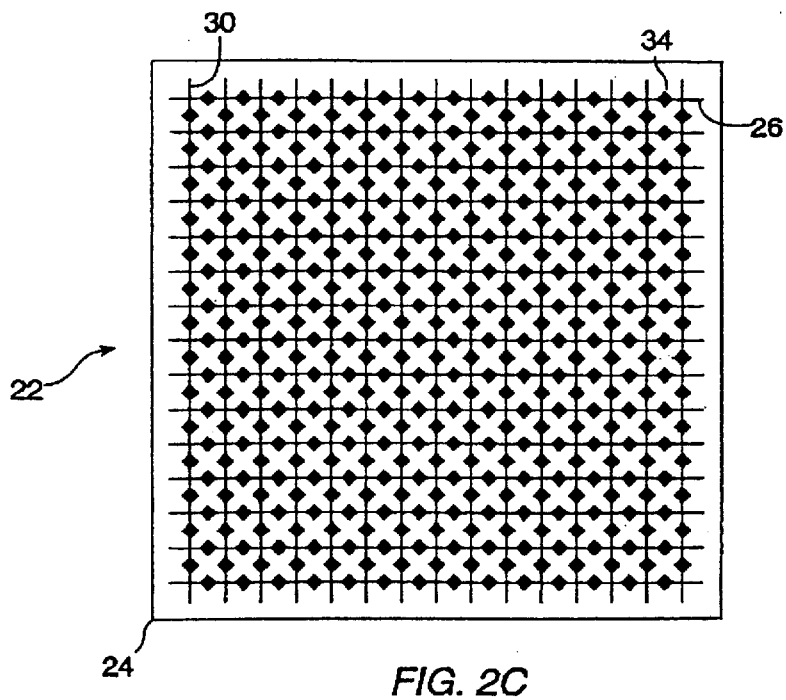
FIG. 2c is a composite view of the object position sensor transducer of FIGS. 2a and 2b showing both the top and bottom conductive trace layers.
Figure 2D:
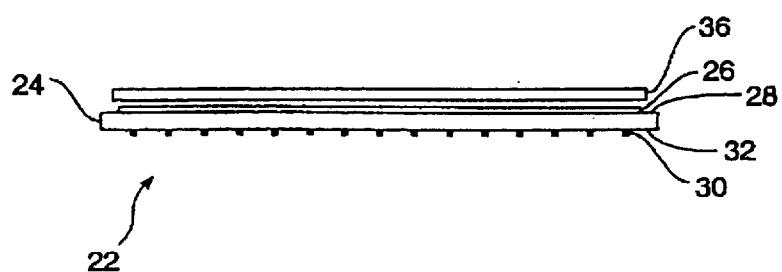
FIG. 2d is a cross-sectional view of the object position sensor transducer of FIGS. 2a–2c.

Referring first to FIG. 1, a simplified block diagram of the capacitive position sensing system 6 of the present invention is presented. Capacitive position sensing system 6 can accurately determine the position of a finger 8 or other conductive object proximate to or touching a sensing plane 10. The capacitance of a plurality of conductive lines running in a first direction (e.g., "X") is sensed by X input processing circuitry 12 and the capacitance of a plurality of conductive lines running in a second direction (e.g., "Y") is sensed by Y input processing circuitry 14. The sensed capacitance values are digitized in both X input processing circuitry 12 and Y input processing circuitry 14. The outputs of X input processing circuitry 12 and Y input processing circuitry 14 are presented to arithmetic unit 16, which uses the digital information to derive digital information representing the position and pressure of the finger 8 or other conductive object relative to the sensing plane 10.

The X, Y, and Z outputs of arithmetic unit 16 are directed to motion unit 18 which provides the cursor motion direction signals to the host computer. Those of ordinary skill in the art will recognize, that as used herein, "host" may mean a stand-alone computer such as an IBM or compatible PC or computer made by Apple Computers, hand-held control units, personal digital assistants, remote communication devices, or the like, or to any other devices or systems which can take as input the output of a touch tablet.

The X, Y, and Z outputs of arithmetic unit 16 are also directed to gesture unit 20, which is used to recognize certain finger gestures performed by a user on sensing plane 10. In addition, gesture unit 20 may produce a signal to motion unit 18 to enable the edge motion feature of the present invention based on the state of gesture processing.

The sensor material can be anything that allows creation of a conductive X/Y matrix of pads. This includes not only standard PC boards, but also includes but is not limited to flexible PC boards, conductive elastomer materials, silk-screened conductive lines, and piezo-electric Kynar plastic materials. This renders it useful as well in any portable equipment application or in human interface where the sensor needs to be molded to fit within the hand.

The sensor can be conformed to any three dimensional surface. Copper can be plated in two layers on most any surface contour producing the sensor. This will allow the sensor to be adapted to the best ergonomic form needed for any particular application. This coupled with the "light-touch" feature will make it effortless to use in many applications. The sensor can also be used in an indirect manner, i.e it can have an insulating foam material covered by a conductive layer over the touch sensing surface and be used to detect any object (not just conductive) that presses against it's surface.

Small sensor areas are practical, i.e., a presently conceived embodiment takes about 1.5"×1.5" of area, however those of ordinary skill in the art will recognize that the area is scaleable for different applications. The matrix area is scaleable by either varying the matrix trace spacing or by varying the number of traces. Large sensor areas are practical where more information is needed.

Besides simple X and Y position information, the sensor technology of the present invention also provides finger pressure information. This additional dimension of information may be used by programs to control special features such as "brush-width" modes in Paint programs, special menu accesses, etc., allowing provision of a more natural sensory input to computers. It has also been found useful for implementing "mouse click and drag" modes and for simple input gestures.

The user will not even have to touch the surface to generate the minimum reaction. This feature can greatly minimize user strain and allow for more flexible use.

The sense system of the present invention depends on a transducer device capable of providing position and pressure information regarding the object contacting the transducer. Referring now to FIGS. 2a–2d, top, bottom, composite, and cross-sectional views, respectively, are shown of a presently-preferred sensing plane 10 comprising a touch sensor array 22 for use in the present invention. Since capacitance is exploited by this embodiment of the present invention, the surface of touch sensor array 22 is designed to maximize the capacitive coupling to a finger or other conductive object.

A presently preferred touch sensor array 22 according to the present invention comprises a substrate 24 including a set of first conductive traces 26 disposed on a top surface 28 thereof and run in a first direction to comprise row positions of the array. A second set of conductive traces 30 are disposed on a bottom surface 32 thereof and run in a second direction preferably orthogonal to the first direction to form the column positions of the array. The top and bottom conductive traces 26 and 30 are alternately in contact with periodic sense pads 34 comprising enlarged areas, shown as diamonds in FIGS. 2a–2c. While sense pads 34 are shown as diamonds in FIGS. 2a–2c, any shape, such as circles, which allows them to be closely packed is equivalent for purposes of this invention. As an arbitrary convention herein, the first conductive traces 26 will be referred to as being oriented in the "X" or "row" direction and may be referred to herein sometimes as "X lines" and the second conductive traces 30 will be referred to as being oriented in the "Y" or "column" direction and may be referred to herein sometimes as "Y lines".

The number and spacing of these sense pads 34 depends upon the resolution desired. For example, in an actual embodiment constructed according to the principles of the present invention, a 0.10 inch center-to-center diamond-shaped pattern of conductive pads disposed along a matrix of 15 rows and 15 columns of conductors is employed. Every other sense pad 34 in each direction in the pad pattern is connected to conductive traces on the top and bottom surfaces 28 and 32, respectively of substrate 24.

Substrate 24 may be a printed circuit board, a flexible circuit board or any of a number of available circuit interconnect technology structures. Its thickness is unimportant as long as contact may be made therethrough from the bottom conductive traces 30 to their sense pads 34 on the top surface 28. The printed circuit board comprising substrate 24 can be constructed using standard industry techniques. Board thickness is not important. Connections from the conductive pads 34 to the bottom traces 30 may be made employing standard plated-through hole techniques well known in the printed circuit board art.

In an alternate embodiment of the present invention, the substrate material 24 may have a thickness on the order of 0.005 to 0.010 inches. Then the diamonds on the upper surface 28 and the plated through holes that connect to the lower surface traces 30, can be omitted, further reducing the cost of the system.

An insulating layer 36 is disposed over the sense pads 34 on top surface 28 to insulate a human finger or other object therefrom. Insulating layer 36 is preferably a thin layer (i.e., approximately 5 mils) to keep capacitive coupling large and may comprise a material, such as mylar, chosen for its protective and ergonomic characteristics. The term "significant capacitive coupling" as used herein shall mean capacitive coupling having a magnitude greater than about 0.5 pF.

According to the preferred embodiment of the invention, a position sensor system including touch sensor array 22 and associated position detection circuitry will detect a finger position on a matrix of printed circuit board traces via the capacitive effect of finger proximity to the sensor array 22. The position sensor system will report the X, Y position of a finger placed near the sensor array 22 to much finer resolution than the spacing between the row and column traces 26 and 30. The position sensor according to this embodiment of the invention will also report a Z value proportional to the outline of that finger and hence indicative of the pressure with which the finger contacts the surface of insulating layer 36 over the sensing array 22.

According to the presently preferred embodiment of the invention, a very sensitive, light-touch detector circuit may be provided using adaptive analog and digital VLSI techniques. The circuit of the present invention is very robust and calibrates out process and systematic errors. The detector circuit of the present invention will process the capacitive input information and provide digital information which may be presented directly to a microprocessor.

According to this embodiment of the invention, sensing circuitry is contained on a single sensor processor integrated circuit chip. The sensor processor chip can have any number of X and Y "matrix" inputs. The number of X and Y inputs does not have to be equal. The Integrated circuit has a digital bus as output. In the illustrative example disclosed in FIGS. 2a–2d herein, the sensor array has 15 traces in both the X and Y directions. The sensor processor chip thus has 15 X inputs and 15 Y inputs. An actual embodiment constructed according to the principles of the present invention employed 18 traces in the X direction and 24 traces in the Y direction. Those of ordinary skill in the art will recognize that the size of the sensing matrix which may be employed in the present invention is arbitrary and will be dictated largely by design choice.

The X and Y matrix nodes are driven and sensed in parallel, with the capacitive information from each line indicating how close a finger is to that node. The scanned information provides a profile of the finger proximity in each dimension. According to this aspect of the present invention, the profile centroid is derived in both the X and Y directions and is the position in that dimension. The profile curve of proximity is also integrated to provide the Z information.

There are three drive and sense methods employed in the touch sensing technology of the present invention. According to a first embodiment of the invention, the voltages on all of the X lines of the sensor matrix are simultaneously moved, while the voltages of the Y lines are held at a constant voltage. Next, the voltages on all of the Y lines of the sensor matrix are simultaneously moved, while the voltages of the X lines are held at a constant voltage. This scanning method accentuates the measurement of capacitance to virtual ground provided by the finger. Those of ordinary skill in the art will recognize that order of these two steps is somewhat arbitrary and may be reversed.

According to a second drive/sense method, the voltages on all of the X lines of the sensor matrix are simultaneously moved in a positive direction, while the voltages of the Y lines are moved in a negative direction. Next, the voltages on all of the X lines of the sensor matrix are simultaneously moved in a negative direction, while the voltages of the Y lines are moved in a positive direction. This second drive/sense method accentuates transcapacitance and de-emphasizes virtual ground capacitance. As with the first drive/sense method, those of ordinary skill in the art will recognize that order of these two steps is somewhat arbitrary and may be reversed.

According to a third, and presently preferred, drive/sense method, the voltages on all of the X lines of the sensor matrix are simultaneously moved, while the voltages of the Y lines are simultaneously moved in the same direction by a voltage corresponding to the background capacitance, with the complete set of sampled points simultaneously giving a profile of the finger in the X dimension. Next, the voltages on all of the Y lines of the sensor matrix are simultaneously moved, while the voltages of the X lines are simultaneously moved in the same direction by the voltage corresponding to the background capacitance to obtain a complete set of sampled points simultaneously giving a profile of the finger in the other dimension. This third drive/sense method ignores the effect of the transcapacitance of the touch pad and renders the touch sensor system relatively immune to environmental conditions such as humidity, etc. As with the first and second drive/sense methods, those of ordinary skill in the art will recognize that order of these two steps is somewhat arbitrary and may be reversed.

Figure 3:
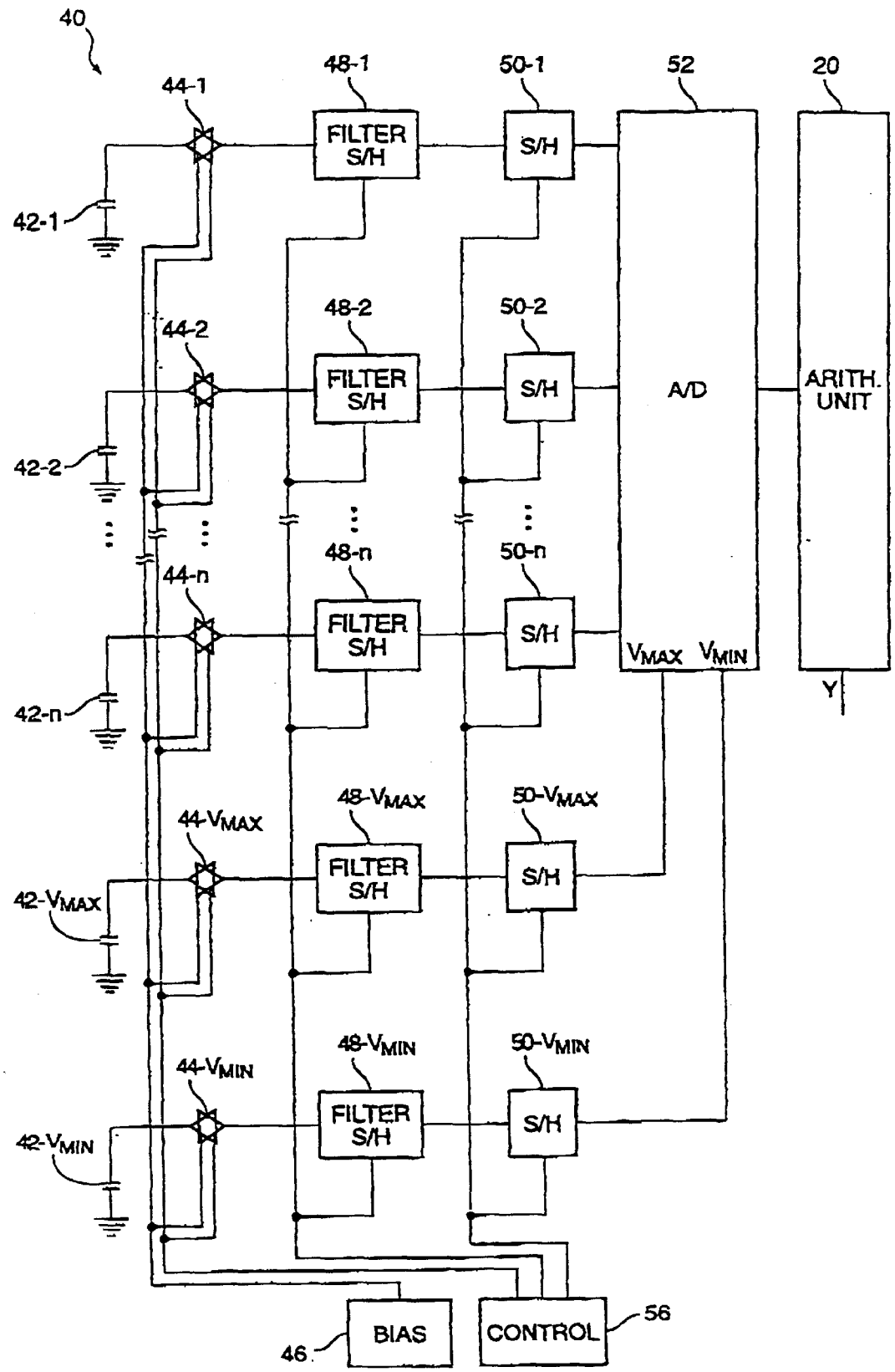
FIG. 3 is a block diagram of sensor decoding electronics which may be used with the sensor transducer in accordance with a preferred embodiment of the present invention.

Referring now to FIG. 3, a block diagram of the presently preferred sensing circuitry 40 for use according to the present invention is presented. This block diagram, and the accompanying disclosure, relates to the sensing circuitry in one dimension (X) only, and includes the X input processing circuitry 12 of FIG. 1. Those of ordinary skill in the art will appreciate that an identical circuit would be used for sensing the opposite (Y) dimension and would include the Y input processing circuitry 14 of FIG. 1. Such skilled persons will further note that the two dimensions do not need to be orthogonal to one another. For example, they can be radial or of any other nature to match the contour of the touch sensor array and other needs of the system. Those of ordinary skill in the art will recognize that the technology disclosed herein could be applied as well to a one-dimensional case where only one set of conductive traces is used.

The capacitance at each sensor matrix node is represented by equivalent capacitors 42-1 through 42-n. The capacitance of capacitors 42-1 through 42-n comprises the capacitance of the matrix conductors and has a characteristic background value when no object (e.g., a finger) is proximate to the sensing plane of the sensor matrix. As an object approaches the sensing plane the capacitance of capacitors 42-1 through 42-n increases in proportion to the size and proximity of the object.

According to the present invention, the capacitance at each sensor matrix node is measured simultaneously using charge integrator circuits 44-1 through 44-n. Charge-integrator circuits 44-1 through 44-n serve to inject charge into the capacitances 42-1 through 42-n, respectively, and to develop an output voltage proportional to the capacitance sensed on the corresponding X matrix line. Thus charge-integrator circuits 44-1 through 44-n are shown as bidirectional amplifier symbols. Each charge-integrator circuit 44-1 through 44-n is supplied with an operating bias voltage by bias-voltage generating circuit 46.

As used herein, the phrase "proportional to the capacitance" means that the voltage signal generated is a monotonic function of the sensed capacitance. In the embodiment described herein, the voltage is directly and linearly proportional to the capacitance sensed. Those of ordinary skill in the art will recognize that other monotonic functions, including but not limited to inverse proportionality, and non-linear proportionality such as logarithmic or exponential functions, could be employed in the present invention without departing from the principles disclosed herein. In addition current-sensing as well as voltage-sensing techniques could be employed.

According to a presently preferred drive/sense method used in the present invention, the capacitance measurements are performed simultaneously across all inputs in one dimension to overcome a problem which is inherent in all prior art approaches that scan individual inputs. The problem with the prior-art approach is that it is sensitive to high frequency and large amplitude noise (large dv/dt noise) that is coupled to the circuit via the touching object. Such noise may distort the finger profile because of noise appearing in a later scan cycle but not an earlier one, due to a change in the noise level.

The present invention overcomes this problem by "taking a snapshot" of all inputs simultaneously in X and then Y directions (or visa versa). Because the injected noise is proportional to the finger signal strength across all inputs, it is therefore symmetric around the finger centroid. Because it is symmetric around the finger centroid it does not affect the finger position, Additionally, the charge amplifier performs a differential measuring function to further reject common-mode noise.

Because of the nature of the charge integrator circuits 44-1 through 44-n, their outputs will be changing over time and will have the desired voltage output for only a short time. As presently preferred, filter circuits 48-1 through 48-n are implemented as sample and hold switched capacitor filters.

The desired voltage is captured by the filter circuits 48-1 through 48-n. As controlled by control circuitry, 56, the filter circuits 48-1 through 48-n will filter out any high frequency noise from the sensed signal. This is accomplished by choosing the capacitor for the filter to be much larger than the output capacitance of charge integrator circuits 44-1 through 44-n. In addition, those of ordinary skill in the art will recognize that the switched capacitor filter circuits 48-1 through 48-n will capture the desired voltages and store them.

According to the present invention, the capacitance information obtained in voltage form from the capacitance measurements is digitized and processed in digital format. Accordingly, the voltages stored by filter circuits 48-1 through 48-n are stored in sample/hold circuits 50-1 through 50-n so that the remainder of the circuitry processes input data taken at the same time. Sample/hold circuits 50-1 through 50-n may be configured as conventional sample/hold circuits as is well known in the art.

The sampled analog voltages at the outputs of sample/hold circuits 50-1 through 50-n are digitized by analog-to-digital (A/D) converters 52. As presently preferred, A/D converters 52 resolve the input voltage to a 10-bit wide digital signal (a resolution of one part in 1,024), although those of ordinary skill in the art will realize that other resolutions may be employed. A/D converters 52 may be conventional successive approximation type converters as is known in the art.

Given the charge integrator circuitry employed in the present invention, the background level (no object present) of the charge integrator outputs will be about 1 volt. The ΔV resulting from the presence of a finger or other object will typically be about 0.4 volt. The voltage range of the A/D converters 52 should therefore be in the range of between about 1–2 volts.

An important consideration is the minimum and maximum voltage reference points for the A/D converters ($V_{min}$ and $V_{max}$). It has been found that noise will cause position jitter if these reference voltages are fixed points. A solution to this problem which is employed in the present invention is to dynamically generate the $V_{min}$ and $V_{max}$ reference voltages from reference capacitances 42-Vmin and 42-Vmax, sensed by charge integrator circuits 44-Vmin and 44-Vmax and processed by filter circuits 48-Vmin and 48-Vmax and stored in sample/hold circuits 50-Vmin and 50-Vmax. In this manner, any common mode noise present when the signals are sampled from the sensor array will also be present in the $V_{min}$ and $V_{max}$ reference voltage values and will tend to cancel. Those of ordinary skill in the art will realize that reference capacitances 44-Vmin and 44-Vmax may either be discrete capacitors or extra traces in the sensor array.

According to the present invention, the $V_{min}$ reference voltage is generated from a capacitor having a value equal to the lowest capacitance expected to be encountered in the sensor array with no object present (about 12 pF assuming a 2 inch square sensor array). The $V_{max}$ reference voltage is generated from a capacitor having a value equal to the largest capacitance expected to be encountered in the sensor array with an object present (about 16 pF assuming a 2 inch square sensor array).

The outputs of AID converters 52 provide inputs to arithmetic unit 16. As will be more fully disclosed with reference to FIG. 8, the function of arithmetic unit 16 is to compute the weighted average of the signals on the individual sense lines in both the X and Y directions in the touch sensor array 22. Thus, arithmetic unit 16 is shared by the X input processing circuitry 12 and the Y input processing circuitry 14 as shown in FIG. 1.

Control circuitry 56 of FIG. 3 orchestrates the operation of the remainder of the circuitry. Because the system is discretely sampled and pipelined in its operation, control circuitry 56 is present to manage the signal flow. The functions performed by control circuitry 56 may be conventionally developed via what is commonly known in the art as a state machine or microcontroller.

The structure and operation of the individual blocks of FIG. 3 will now be disclosed. Referring now to FIGS. 4a, 4b, 4c, and 5, a typical charge integrator circuit will be described. Charge integrator circuit 44 is shown as a simplified schematic diagram in FIG. 4a and as an illustrative schematic diagram in FIG. 4b. The timing of the operation of charge integrator circuit 44 is shown in FIG. 5. These timing signals are provided by the controller block 56.

Charge integrator circuit 44 is based on the fundamental physical phenomena of using a current to charge a capacitor. If the capacitor is charged for a constant time by a constant current, then a voltage will be produced on the capacitor which is inversely proportional to the capacitance. The capacitance to be charged is the sensor matrix line capacitance 42 in parallel with an internal capacitor. This internal capacitor will contain the voltage of interest.

Figure 4A:
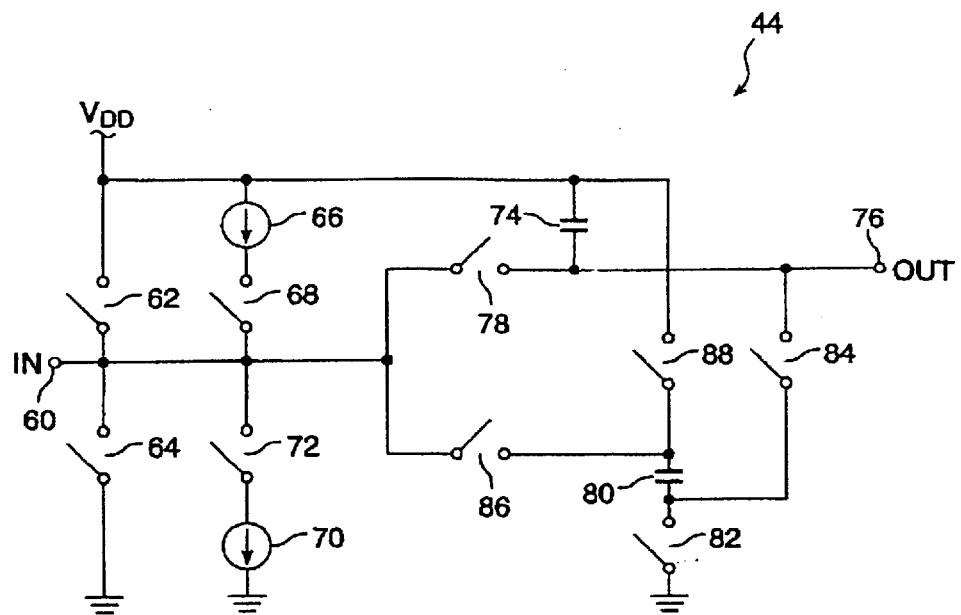
FIG. 4a is a simplified schematic diagram of a charge integrator circuit which may be used in the present invention.
Figure 5:
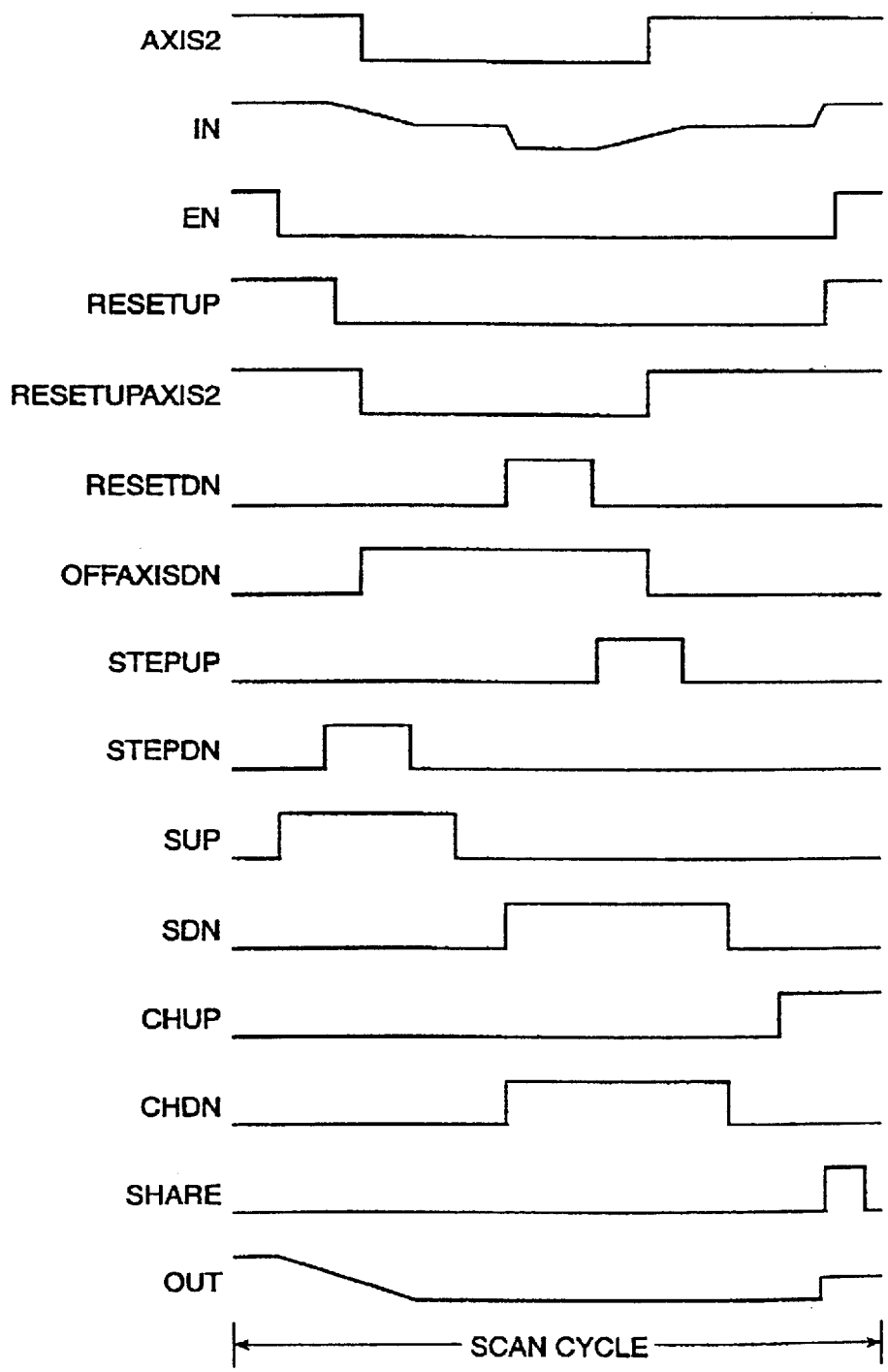
FIG. 5 is a timing diagram of the operation of charge integrator circuit of FIGS. 4a and 4b, as well as the circuitry of FIG. 4c.

Referring now to FIG. 4a, a simplified schematic diagram of an illustrative charge integrator circuit 44 is shown. A charge integrator circuit input node 60 is connected to one of the X (or Y) conductive lines of the sensor matrix. A first shorting switch 62 is connected between the charge integrator circuit input node 60 and $V_{DD}$, the positive supply rail. A second shorting switch 64 is connected between the charge integrator circuit input node 60 and ground, the negative supply rail. A positive constant current source 66 is connected to $V_{DD}$, the positive supply rail and to the charge integrator circuit input node 60 and through a first current source switch 68. A negative constant current source 70 is connected to ground and to the charge integrator circuit input node 60 and through a second current source switch 72. It is obvious that other high and low voltage rails could be used in place of $V_{DD}$ and ground.

A first internal capacitor 74 is connected between $V_{DD}$ and output node 76 of charge integrator circuit 44. A positive voltage storage switch 78 is connected between output node 76 and input node 60. A second internal capacitor 80 has one of its plates connected to ground through a switch 82 and to output node 76 of charge integrator circuit 44 through a switch 84, and the other one of its plates connected to input node 60 through a negative voltage storage switch 86 and to $V_{DD}$ through a switch 88. The capacitance of first and second internal capacitances 74 and 80 should be a small fraction (i.e., about 10%) of the capacitance of the individual sensor matrix lines. In a typical embodiment, the sensor matrix line capacitance will be about 10 pF and the capacitance of capacitors 74 and 80 should be about 1 pF.

According to a presently preferred embodiment of the invention, the approach used is a differential measurement for added noise immunity, the benefit of which is that any low frequency common mode noise gets subtracted out. For the following discussion, it is to be assumed that all switches are open unless they are noted as closed. First, the sensor matrix line is momentarily shorted to $V_{DD}$ through switch 62, switch 78 is closed connecting capacitor 74 in parallel with the capacitance of the sensor line. Then the parallel capacitor combination is discharged with a constant current from current source 70 through switch 72 for a fixed time period. At the end of the fixed time period, switch 78 is opened, thus storing the voltage on the sensor matrix line on capacitor 74.

The sensor line is then momentarily shorted to ground through switch 64, and switches 82 and 86 are closed to place capacitor 80 in parallel with the capacitance of the sensor line. Switch 68 is closed and the parallel capacitor combination is charged with a constant current from current source 66 for a fixed time period equal to the fixed time period of the first cycle. At the end of the fixed time period, switch 86 is opened, thus storing the voltage on the sensor matrix line on capacitor 80.

The first and second measured voltages are then averaged. This is accomplished by opening switch 82 and closing switches 88 and 84, which places capacitor 80 in parallel with capacitor 74. Because capacitors 74 and 80 have the same capacitance, the resulting voltage across them is equal to the average of the voltages across each individually. This final result is the value that is then passed on to the appropriate one of filter circuits 48-1 through 48-n.

The low frequency noise, notably 50/60 Hz and their harmonics, behaves as a DC current component that adds in one measurement and subtracts in the other. When the two results are added together that noise component averages to zero. The amount of noise rejection is a function of how quickly in succession the two opposing charge-up and charge-down cycles are performed as will be disclosed herein. One of the reasons for the choice of this charge integrator circuit is that measurements may be taken quickly.

Figure 4B:
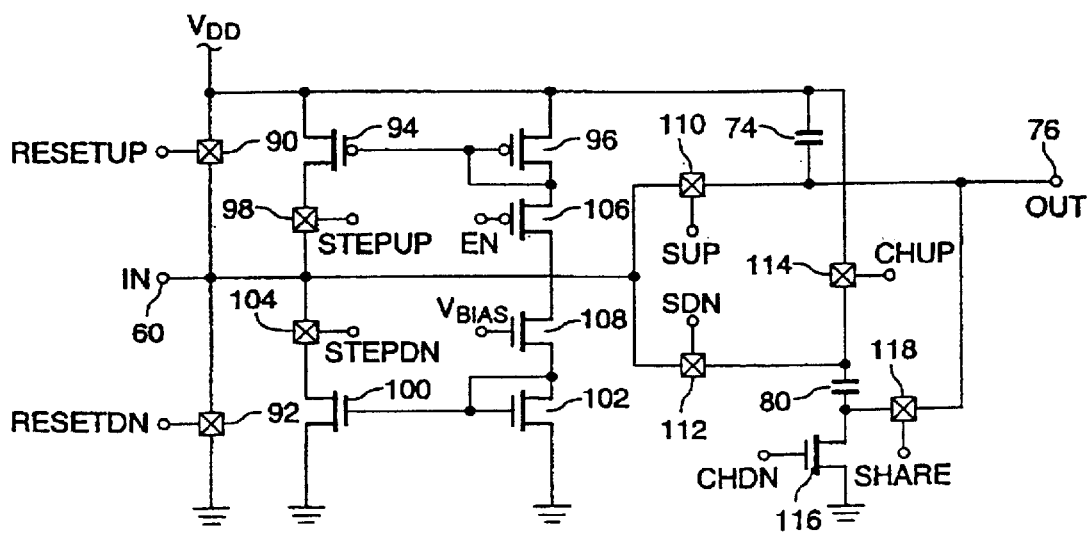

Referring now to FIG. 4b, a more complete schematic diagram of an illustrative embodiment of charge integrator circuit 44 of the simplified diagram of FIG. 4a is shown. Input node 60 is shown connected to $V_{DD}$ and ground through pass gates 90 and 92, which replace switches 62 and 64 of FIG. 4a. Pass gate 90 is controlled by a signal ResetUp presented to its control input and pass gate 92 is controlled by a signal ResetDn presented to its control input. Those of ordinary skill in the art will recognize that pass gates 90 and 92, as well as all of the other pass gates which are represented by the same symbol in FIG. 4b may be conventional CMOS pass gates as are known in the art. The convention used herein is that the pass gate will be off when its control input is held low and will be on and present a low impedance connection when its control input is held high.

P-Channel MOS transistors 94 and 96 are configured as a current mirror. P-Channel MOS transistor 94 serves as the current source 66 and pass gate 98 serves as switch 68 of FIG. 4a. The control input of pass gate 98 is controlled by a signal StepUp.

N-Channel MOS transistors 100 and 102 are also configured as a current mirror. N-Channel MOS transistor 100 serves as the current source 70 and pass gate 104 serves as switch 72 of FIG. 4a. The control input of pass gate 104 is controlled by a signal StepDn. P-Channel MOS transistor 106 and N-Channel MOS transistor 108 are placed in series with P-Channel MOS current mirror transistor 96 and N-Channel MOS current mirror transistor 102. The control gate of P-Channel MOS transistor 106 is driven by an enable signal EN, which turns on P-Channel MOS transistor 106 to energize the current mirrors. This device is used as a power conservation device so that the charge integrator circuit 44 may be turned off to conserve power when it is not in use.

N-Channel MOS transistor 108 has its gate driven by a reference voltage Vbias, which sets the current through current mirror transistors 96 and 108. The voltage Vbias is set by a servo feedback circuit as will be disclosed in more detail with reference to FIG. 10. Those of ordinary skill in the art will appreciate that this embodiment allows calibration to occur in real time (via long time constant feedback) thereby zeroing out any long term effects due to sensor environmental changes. In a current embodiment of the invention, Vbias is common for all charge integrator circuits 44-1 through 44-n and 44-Vmax and 44-Vmin.

Note that proper sizing of MOS transistors 102 and 108 may provide temperature compensation. This is accomplished by taking advantage of the fact that the threshold of N-Channel MOS transistor 108 reduces with temperature while the mobility of both N-Channel MOS transistors 102 and 108 reduce with temperature. The threshold reduction has the effect of increasing the current while the mobility reduction has the effect of decreasing the current. By proper device sizing these effects can cancel each other out over a significant part of the operating range.

Capacitor 74 has one plate connected to $V_{DD}$ and the other plate connected to the output node 76 and to the input node 60 through pass gate 110, shown as switch 78 in FIG. 4a. The control input of pass gate 110 is driven by the control signal SUp. One plate of capacitor 80 is connected to input node 60 through pass gate 112 (switch 86 in FIG. 4a) and to $V_{DD}$ through pass gate 114 (switch 82 in FIG. 4a). The control input of pass gate 112 is driven by the control signal SDn and the control input of pass gate 114 is driven by the control signal ChUp. The other plate of capacitor 80 is connected to ground through N-Channel MOS transistor 116 (switch 82 in FIG. 4a) and to output node 76 through pass gate 118 (switch 84 in FIG. 4a). The control input of pass gate 118 is driven by control signal Share.

Referring now to FIGS. 4a, 4b and the timing diagram of FIG. 5, the operation of charge integrator circuit 44 during one scan cycle may be observed. First the EN (enable) control signal goes active by going to 0v. This turns on the current mirrors and energizes the charge and discharge current sources, MOS transistors 94 and 100. The ResetUp control signal is active high at this time, which shorts the input node 60 (and the sensor conductive line to which it is connected) to $V_{DD}$. The SUp control signal is also active high at this time which connects capacitor 74 and the output node 76 to input node 60. This arrangement guarantees that the following discharge portion of the operating cycle always starts from a known equilibrium state.

The discharge process starts after the ResetUp control signal goes inactive. The StepDn control signal goes active, connecting MOS transistor 100, the discharge current source, to the input node 60 and its associated sensor line. StepDn is active for a set amount of time, and the negative constant current source discharges the combined capacitance of the sensor line and capacitor 74 thus lowering its voltage during that time. StepDn is then turned off. A short time later the SUp control signal goes inactive, storing the measured voltage on capacitor 74. That ends the discharge cycle.

Next, the ResetDn control signal becomes active and shorts the sensor line to ground. Simultaneously the SDn and ChDn control signals become active and connect capacitor 80 between ground and the sensor line. Capacitor 80 is discharged to ground, guaranteeing that the following charge up cycle always starts from a known state.

The charge up cycle starts after ResetDn control signal becomes inactive and the StepUp control signal becomes active. At this point the current charging source, MOS transistor 94, is connected to the sensor line and supplies a constant current to charge the sensor line by increasing the voltage thereon. The StepUp control signal is active for a set amount of time (preferably equal to the time for the previously mentioned cycle) allowing the capacitance to charge, and then it is turned off. The SDn control signal then goes inactive, leaving the measured voltage across capacitor 80.

The averaging cycle now starts. First the voltage on capacitor 80 is level shifted. This is done by the ChDn control signal going inactive, letting one plate of the capacitor 80 float. Then the ChUp control signal goes active, connecting the second plate of the capacitor to $V_{DD}$. Then the Share control signal becomes active which connects the first plate of capacitor 80 to output node 76, thus placing capacitors 74 and 80 in parallel. This has the effect of averaging the voltages across the two capacitors, thus subtracting out common-mode noise as previously described. This average voltage is also then available on output node 76.

Those of ordinary skill in the art will recognize that the environmental alternating current and other low frequency noise-canceling feature inherent in the averaging of the voltages obtained in the discharge and charge cycles is most effective when the two cycles are performed very close together in time. According to the present invention, the ChDn and ChUp signals should be asserted with respect to each other within a time period much less than a quarter of the period of the noise to be canceled in order to take advantage of this feature of the present invention.

According to the present invention, three different drive/sense methods have been disclosed. Those of ordinary skill in the art will readily observe that the charge integrator circuit 44 disclosed with reference to FIGS. 4a, 4b, and 5 is adaptable to operate according to any of the scanning methods disclosed herein.

When the third drive/sense method according to the presently preferred embodiment of the invention is utilized, the X lines are driven and sensed while the Y lines are driven in the same direction and then the Y lines are driven and sensed while the X lines are driven in the same direction. Additional circuitry and timing signals are necessary to accomplish the driving of the non-sensed lines in the same direction as the sensed lines. For purposes of this discussion, the sensed direction or axis (i.e., X and Y) will be referred to as Axis 1 and the non-sensed direction or axis will be referred to as Axis 2. Those of ordinary skill in the art will recognize that the identities of Axis 1 and Axis 2 are constantly alternating between the X and Y directions as the capacitance of the touchpad is measured along both axes according to the method of the present invention.

Two additional control signals are utilized according to the third drive/sense method of the present invention to produce one additional output signal. The output signal, Axis2, is the waveform appearing on all of the conductive lines of the row or column of the array which is defined as being the Axis 2 direction during sensing according to the third drive/sense method of the present invention. The Axis2 signal is a voltage which has the same polarity as the driving voltage applied to all of the conductive lines in the Axis 1 direction in the sensing matrix. This voltage is a square wave which follows the "no object present" drive voltage of Axis 1. The transitions of the square wave must happen after the voltages on Axis 1 traces are no longer held fixed, but before the Axis1 voltages are measured. The timing of the transitions causes the transcapacitance of Axis2 to be largely cancelled during the measurement of Axis1 capacitance. In an actual embodiment of the invention, the Axis2 waveform driven onto conductive lines has been driven to about 1 volt while charge is being removed from Axis1 traces, and to about Vdd while charge is being injected into Axis 1 traces.

Figure 4C:
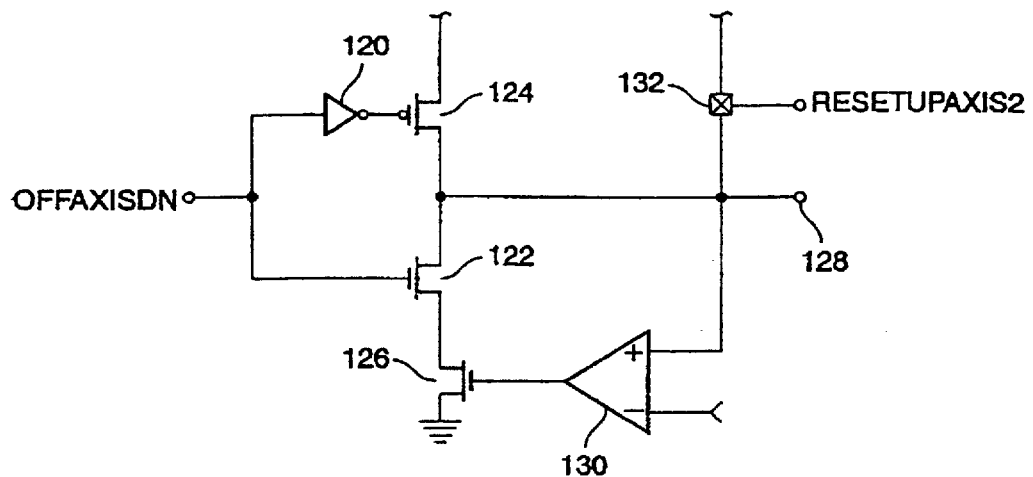
FIG. 4c is an illustrative schematic diagram of an additional portion of the drive/sense electronics which may be used with the touch sensor of the present invention to drive the sense lines of the non-sensed axis to a voltage in the same direction as the axis being sensed.

Referring now to FIG. 4c, a schematic diagram is presented of an illustrative circuit whose elements may be added to the circuits disclosed in FIGS. 4a and 4b for the purpose of driving one of the conductive lines in the sensing matrix with the waveform Axis2 when that conductive line is acting as an Axis 2 conductive line.

A first control signal OffaxisDn drives the input of inverter 120 and the gate of N-Channel MOS transistor 122. The output of inverter 120 drives the gate of P-Channel MOS transistor 124, having its source connected to $V_{DD}$ and its drain connected to the drain of N-Channel MOS transistor 122. The source of N-Channel MOS transistor 122 is connected to the drain of an N-Channel MOS transistor 126, which has its source connected to ground. The common drain connection of transistors 122 and 124 form a node 128 which is connected to one of the conductive lines in the sensing matrix of the capacitive touch sensor of the present invention. P-Channel MOS transistor 124 and N-Channel MOS transistor 122 form a tri-state buffer for the pulldown signal which comprises the waveform Axis2. Those of ordinary skill in the art will recognize that there is one circuit of FIG. 4c for each conductive line in both the X and Y directions of the capacitive touch sensor of the present invention.

The gate of N-Channel MOS transistor 126 is driven by the output of transconductance amplifier 130. The non-inverting input of transconductance amplifier 130 is connected to node 128 and its inverting input is connected to a voltage source. In the illustrative circuit of FIG. 4c, the voltage source presently preferred is a circuit node in the circuit of FIG. 10, disclosed later herein. Finally, passgate 132 is connected between $V_{DD}$ and node 128. Passgate 132 is driven from a second control signal, ResetUpAxis2.

Because the circuits of FIG. 4c are employed to drive the conductive lines of the axis which is not being sensed, the control signals ResetUpAxis2 and OffaxisDn are only asserted when the conductive line to which node 128 is connected is an Axis 2 line during the drive/sense operation. The generation of these control signals, by state machine and other equivalent hardware and software solutions, is well understood in the art, and particular solutions for generating these signals will apply to particular designs and are beyond the necessary scope of this disclosure.

The circuit of FIG. 4c has three states. In a first state, neither the ResetUpAxis2 nor the OffaxisDn control signal are asserted, in which case the node 128 (and the conductive line in the sensing matrix to which it is connected) is isolated by high impedance from the circuit of FIG. 4c and may thus be controlled by the circuits of FIGS. 4a and 4b as previously described herein. In this first state, the axis with which the circuit of FIG. 4c is associated is the active Axis 1 and is controlled as previously disclosed herein.

In the second state, control signal ResetUpAxis2 is asserted and the node 128 is pulled up to $V_{DD}$. Those of ordinary skill in the art will recognize that the control signal ResetUpAxis2 could be used to compile a state machine term which could control a single switch to pull up node 128 to VDD for assertions of both control signals ResetUpAxis2 and ResetUp if desired.

In the third state, control signal OffaxisDn is asserted and the node 128 is servo-ed to the voltage determined by the voltage at the inverting input to transconductance amplifier 130. In an actual embodiment of the present invention, this voltage is about 1 volt.

As can be seen from an examination of FIG. 5., the ResetUpAxis2 and OffaxisDn signals are complementary. The ResetUpAxis2 signal drives the node 128 to the high supply rail when the ResetUp signal for the Axis 1 conductive lines also pulls the Axis 1 lines to the high supply rail. The ResetUpAxis2 signal is deasserted during the time when the signal StepDn is active. Once the ResetUpAxis2 signal goes inactive, the OffaxisDn signal becomes active and pulls the Axis2 signal at node 128 to the low value as seen in FIG. 5. The OffaxisDn signal goes inactive when StepUp signal is active and the ResetUpAxis2 signal again becomes active to pull the Axis2 signal at node 128 to the high supply rail value for the rest of the charge cycle as seen in FIG. 5.

Thus, during the Axis 2 phase of the operation of the sensor system of the present invention, the node 128 is always pulled in the direction of the voltage to which the Axis 1 conductive lines are being driven by either charge or discharge cycles.

Figure 6:
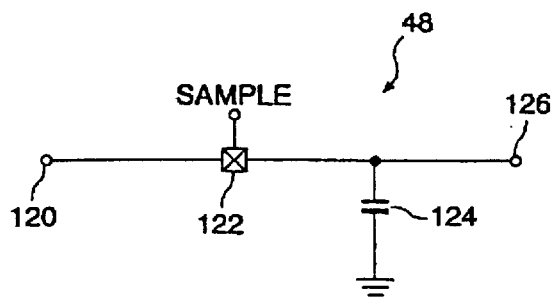
FIG. 6 is a schematic diagram of an illustrative filter and sample/hold circuit for use in the present invention.

As is clear from an understanding of the operation of charge integrator circuit 44, its output voltage is only available for a short period of time and is subject to environmental noise. In order to minimize the effects of noise, a switched capacitor filter circuit 48 is used. Referring now to FIG. 6, a schematic diagram of an illustrative switched capacitor filter circuit 48 which may be used in the present invention is shown. Those of ordinary skill in the art will recognize this switched capacitor filter circuit, which comprises an input node 132, a pass gate 134 having a control input driven by a Sample control signal, a capacitor 136 connected between the output of the pass gate 134 and a fixed voltage such as ground, and an output node 138 comprising the common connection between the capacitor 136 and the output of the pass gate 134. In a typical embodiment, capacitor 136 will have a capacitance of about 10 pF.

As will be appreciated by persons of ordinary skill in the art, the switched capacitor filter 48 is in part a sample/hold circuit and has a filter time constant which is K times the period of sample, where K is the ratio of capacitor 136 to the sum of capacitors 74 and 80 of the charge integrator circuit 44 of FIGS. 4a and 4b to which it is connected. The switched capacitor filter circuit 48 further reduces noise injection in the system. In the preferred embodiment, K=10/2=5. Those of ordinary skill in the art will recognize that other types of filter circuits, such as RC filters, may be employed in the present invention.

Figure 7:
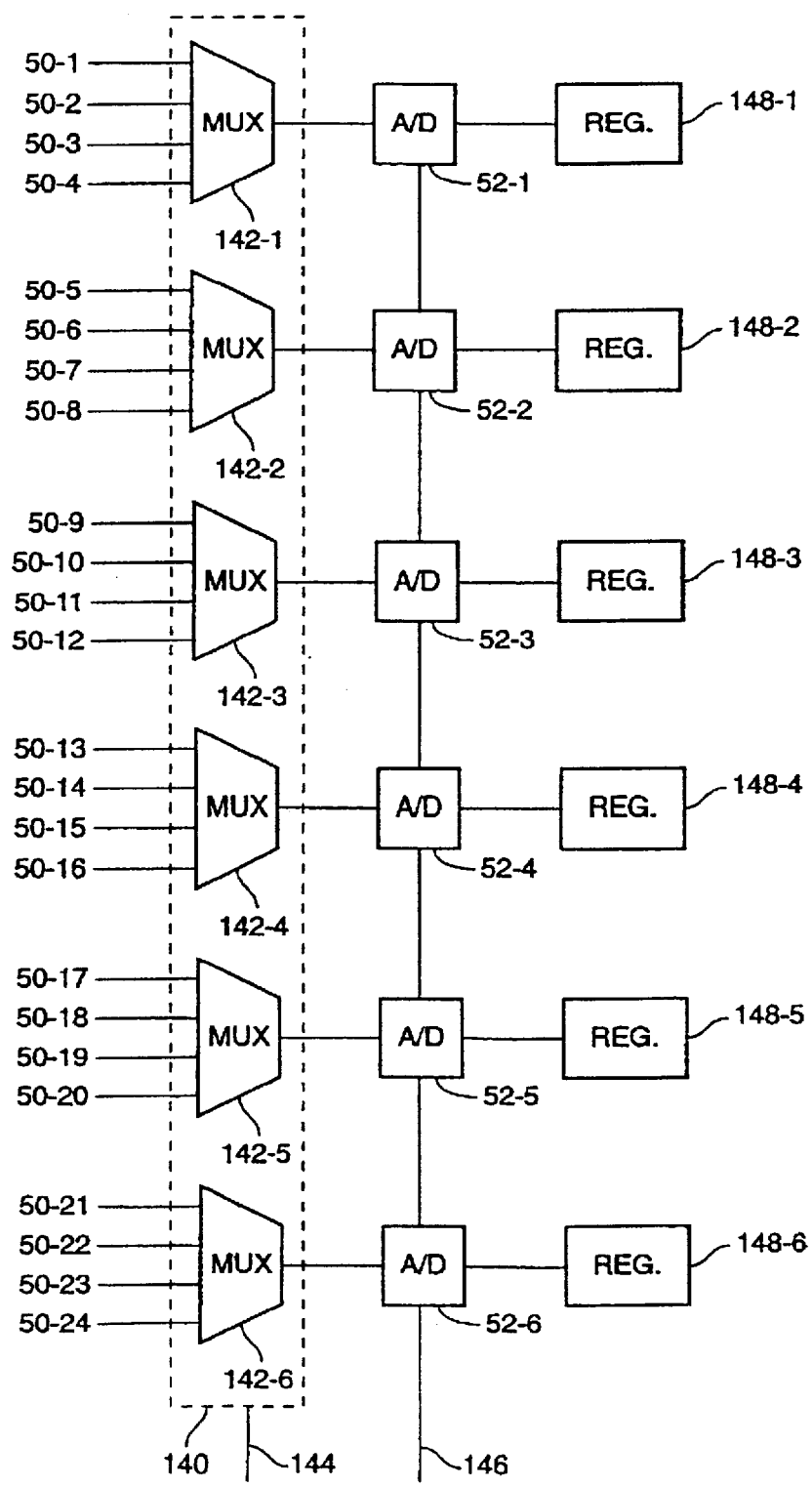
FIG. 7 is a more detailed block diagram of a presently preferred arrangement of A/D converters for use in the present invention.

Referring now to FIG. 7, a more detailed block diagram of a presently preferred arrangement of A/D converters 52 of FIG. 3 is presented. There are fewer A/D converters than there are lines in the touch sensor array, and the inputs to the A/D converters are multiplexed to share each of the individual A/D converters among several lines in the touch sensor array. The arrangement in FIG. 7 is more efficient in the use of integrated circuit layout area than providing individual A/D converters for each input line.

In the embodiment illustrated in FIG. 7, twenty-four conductive line traces are assumed for the sensor array 10 of FIGS. 2a–2d. As shown in FIG. 7, the outputs of sample/hold circuits 50-1 through 50-24 are fed to the analog data inputs of analog multiplexer 140. Analog multiplexer 140 has six outputs, each of which drives the input of an individual A/D converter 52-1 through 52-6. The internal arrangement of analog multiplexer 140 is such that four different ones of the inputs are multiplexed to each of the outputs. Analog multiplexer 140 has been conceptually drawn as six internal multiplexer blocks 142-1 through 142-6.

In the example shown in FIG. 7, inputs taken from sample/hold circuits 50-1 through 50-4 are multiplexed to the output of internal multiplexer block 142-1 which drives A/D converter 52-1. Similarly, inputs taken from sample/hold circuits 50-5 through 50-8 are multiplexed to the output of internal multiplexer block 142-2 which drives A/D converter 52-2; inputs taken from sample/hold circuits 50-9 through 50-12 are multiplexed to the output of internal multiplexer block 142-3 which drives A/D converter 52-3; inputs taken from sample/hold circuits 50-13 through 50-16 are multiplexed to the output of internal multiplexer block 142-4 which drives A/D converter 52-4; inputs taken from sample/hold circuits 50-17 through 50-20 are multiplexed to the output of internal multiplexer block 142-5 which drives A/D converter 52-5; and inputs taken from sample/hold circuits 50-21 through 50-24 are multiplexed to the output of internal multiplexer block 142-6 which drives A/D converter 52-6.

Analog multiplexer 130 has a set of control inputs schematically represented by bus 144. In the illustrative embodiment shown in FIG. 7, each of internal multiplexers 142-1 through 142-6 are four-input multiplexers and thus control bus 144 may comprise a two-bit bus for a one-of-four selection. Those of ordinary skill in the art will recognize that the arrangement of FIG. 7 is merely one of a number of specific solutions to the task of A/D conversion from twenty-four channels, and that other satisfactory equivalent arrangements are possible.

In a straightforward decoding scheme, multiplexers 142-1 through 142-6 will pass, in sequence, the analog voltages present on their first through fourth inputs on to the inputs of A/D converters 52-1 through 52-6 respectively. After the analog values have settled in the inputs of A/D converters 52-1 through 52-6, a CONVERT command is asserted on common A/D control line 146 to begin the A/D conversion process.

When the A/D conversion process is complete, the digital value representing the input voltage is stored in registers 148-1 through 148-6. As presently preferred, registers 148-1 through 148-6 may each comprise a two-word register, so that one word may be read out of the registers to arithmetic unit 54 while a second word is being written into the registers in order to maximize the speed of the system. The design of such registers is conventional in the art.

Figure 8:
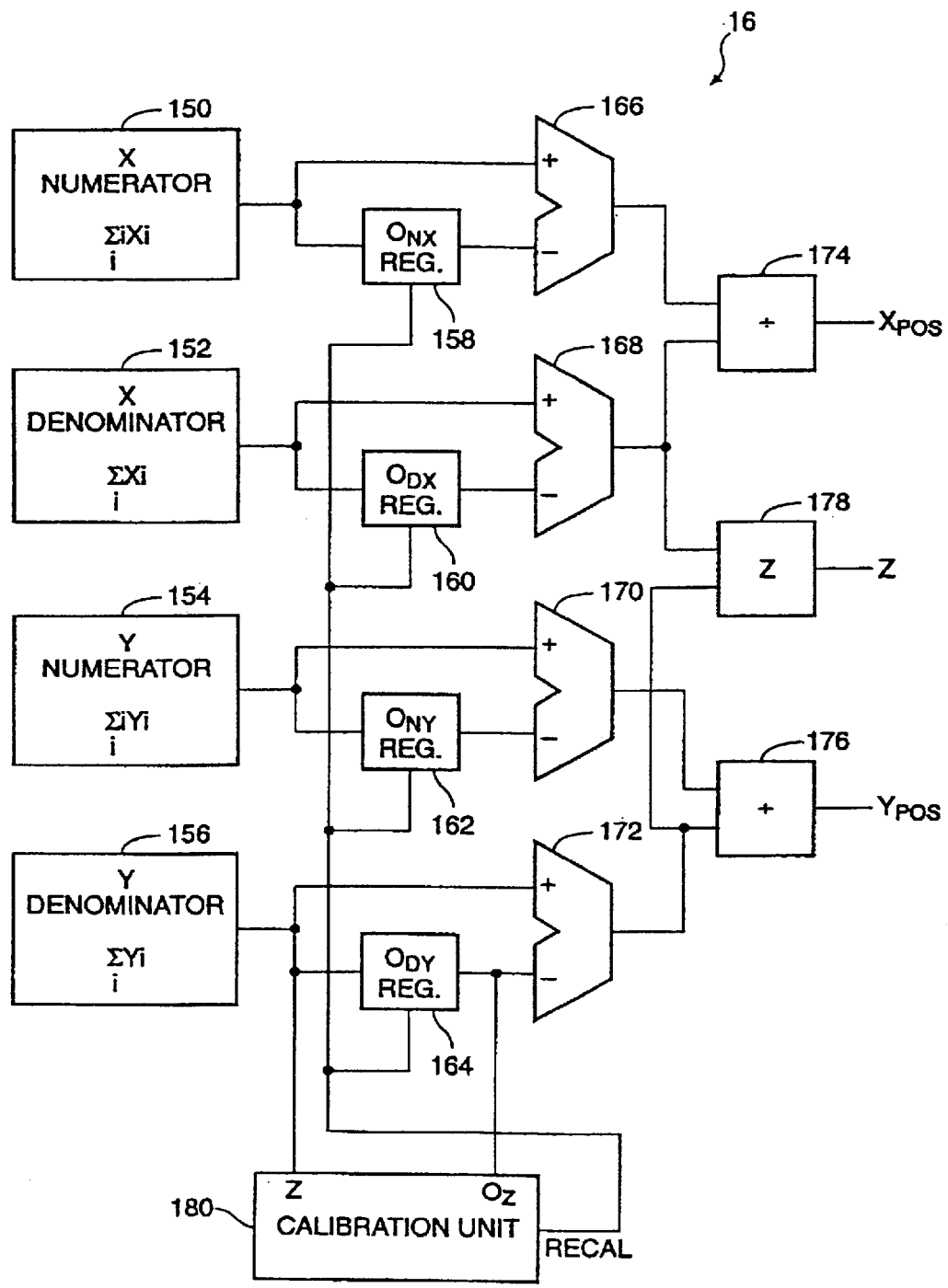
FIG. 8 is a block diagram of an illustrative arithmetic unit which may be used in the present invention.

Referring now to FIG. 8, a more detailed block diagram of the arithmetic unit 16 is presented. Those of ordinary skill in the art will appreciate that arithmetic unit 16 processes information from both the X and Y dimensions, i.e., from X input processing circuit 12 and Y input processing circuit 14 of FIG. 1.

Before disclosing the structural configuration of arithmetic unit 16, it is helpful to understand the preferred method by which the centroid position of an object proximate to the sensor array 22 is determined according to the present invention.

According to a presently preferred embodiment of the invention, the object position in either direction may be determined by evaluating the weighted average of the capacitances measured on the individual sense line of the sensor array 10. In the following discussion, the X direction is used, but those of ordinary skill in the art will recognize that the discussion applies to the determination of the weighted average in the Y direction as well. As is well known, the weighted average may be determined as follows:

$$X \text{ position} = \frac{\sum_{i=0}^{n} i \times \Delta C_i}{\sum_{i=0}^{n} \Delta C_i} \qquad [\text{Eq. 1}]$$

where $\Delta C_i = C_i - CO_i$. $C_i$ is the capacitance presently being measured on the ith trace and $CO_i$ is the value measured on that same trace at some past time when no object was present. In terms of these past and present capacitance measurements, the position can be expressed as:

$$X \text{position} = \frac{\sum_{i=0}^{n} i \times (C_i - CO_i)}{\sum_{i=0}^{n} (C_i - CO_i)} \qquad [\text{Eq. 2}]$$

Using the distributive property of multiplication over addition, this expression is seen to be equivalent to:

$$X\text{position} = \frac{-\sum_{i=0}^{n}(i \times C0_i) + \sum_{i=0}^{n}(i \times C_i)}{-\sum_{i=0}^{n}(C0_i) + \sum_{i=0}^{n}(C_i)} \quad \text{[Eq. 3]}$$

where the negative terms in both the numerator and denominator are offsets and represent the background value of the capacitances with no object present. If the term $O_N$ is used to represent the numerator offset and the term $O_D$ is used to represent the denominator offset, Eq. 3 may be re-written as:

$$X\text{postition} = \frac{-O_N + \sum_{i=0}^{n}(i \times C_i)}{-O_D + \sum_{i=0}^{n}(C_i)} \quad \text{[Eq. 4]}$$

Referring now to FIG. 8, it may be seen that arithmetic unit 16 includes X numerator and denominator accumulators 150 and 152 and Y numerator and denominator accumulators 154 and 156. The source of operand data for X numerator and denominator accumulators 150 and 152 and Y numerator and denominator accumulators 154 and 156 are the registers 138-1 through 138-6 in each (X and Y) direction of the sensor array 22 of FIG. 1. The X and Y denominator accumulators 152 and 156 sum up the digital results from the A/D conversions. The X and Y numerator accumulators 150 and 154 compute the weighted sum of the input data rather than the straight sum. Accumulators 150, 152, 154, and 156 may be configured as hardware elements or as software running on a microprocessor as will be readily understood by those of ordinary skill in the art.

As may be seen from an examination of FIG. 8, numerator accumulators 150 and 154 compute the expression of Eq. 4:

$$\sum_{i=0}^{n} i \times C_i \quad \text{[Eq. 5]}$$

and denominator accumulators 152 and 156 compute the expression of Eq. 4:

$$\sum_{i=0}^{n} C_i \quad \text{[Eq. 6]}$$

The contents of X and Y numerator and denominator offset registers 158, 160, 162, and 164 are subtracted from the results stored in the accumulators 150, 152, 154, and 156 in adders 166, 168, 170, and 172. Adder 166 subtracts the offset $O_{NX}$ stored in X numerator offset register 158. Adder 168 subtracts the offset $O_{DX}$ stored in X denominator offset register 160. Adder 170 subtracts the offset $O_{NY}$ stored in Y numerator offset register 162. Adder 172 subtracts the offset $O_{DY}$ stored in Y denominator offset register 164. The numerator denominator pairs are divided by division blocks 174 and 176 to produce the X and Y position data, and the X and Y denominator pair is used by block 178 to produce Z axis (pressure) data. The function performed by block 178 will be disclosed later herein. The offsets $O_{DX}$, $O_{NX}$, $O_{DY}$, and $O_{NY}$ are sampled from the accumulator contents when directed by calibration unit 180.

Persons of ordinary skill in the art will readily appreciate that the architecture of the system of the present invention may be distributed in a number of ways, several of which involve the availability of a microprocessor, whether it be in a host computer to which the system of the present invention is connected or somewhere between the integrated circuit described herein and a host computer. Embodiments of the present invention are contemplated wherein the accumulated numerator and denominator values representing the summation terms are delivered to such a microprocessor along with the $O_N$ and $O_D$ offset values for processing, or where all processing is accomplished by a programmed microprocessor as is known in the art.

Initially, the numerator and denominator accumulators 150, 152, 154, and 156 are set to zero during system startup. If the multiplexed A/D converters as shown in FIG. 7 are employed, the digitized voltage data in the first word of register 138-1 (representing the voltage at the output of sample/hold circuit 50-1) is added to the sum in the accumulator and the result stored in the accumulator. In succession, the digitized voltage values stored in the first word of registers 138-2 through 138-6 (representing the voltage at the outputs of sample/hold circuits 50-5, 50-9, 50-13, 50-17, and 50-21, respectively) are added to the sums in the accumulators and the results stored in the accumulators. As previously mentioned, A/D converters 52-1 through 52-6 may at this time be converting the voltages present at the outputs of sample/hold circuits 50-2, 50-6, 50-10, 50-14, 50-18, and 50-22 and storing the digitized values in the second words of registers 138-1 through 138-6 respectively.

Next, in succession, the digitized voltage values stored in the second words of registers 138-1 through 138-6 (representing the voltage at the outputs of-sample/hold circuits 50-2, 50-6, 50-10, 50-14, 50-18, and 50-22, respectively) are added to the sum in the accumulator and the result stored in the accumulator.

Next, in succession, the digitized voltage values stored in the first words of registers 138-1 through 138-6 (representing the voltage at the outputs of sample/hold circuits 50-3, 50-7, 50-11, 50-15, 50-19, and 50-23, respectively) are added to the sum in the accumulator and the result stored in the accumulator, followed by digitized voltage values stored in the second words of registers 138-1 through 138-6 (representing the voltage at the outputs of sample/hold circuits 50-4, 50-8, 50-12, 50-16, 50-20, and 50-24, respectively).

At this point in time, the accumulators hold the sums of all of the individual digitized voltage values. The digital values stored in the $O_N$ and $O_D$ offset registers 158, 160, 162, and 164 are now respectively subtracted from the values stored in the numerator and denominator accumulators. The division operation in dividers 174 and 176 then completes the weighted average computation.

The division operation may also be performed by an external microprocessor which can fetch the values stored in the accumulators or perform the accumulations itself. As the $O_N$ and $O_D$ offset values are presently derived by an external microprocessor, the additional processing overhead presented to such external microprocessor by this division operation is minimal. Alternately, a dedicated microprocessor may be included on chip to handle these processing tasks without departing from the invention disclosed herein.

The above disclosed processing takes place within about 1 millisecond and may be repeatedly performed. Current mouse standards update position information 40 times per second, and thus the apparatus of the present invention may easily be operated at this repetition rate.

Because of the nature of the method employed in the present invention, an opportunity exists to provide additional noise immunity without requiring additional hardware in the system of the present invention. While it is apparent that after the above-disclosed sequence has been performed, the accumulators may be cleared and the process repeated, the values may also be allowed to remain in the accumulators. If this is done, an averaging function may be implemented to further filter out noise. According to this aspect of the invention, a number of samples are taken and run through the accumulators without clearing them at the end of the processing sequence. As presently preferred, twenty-five samples are processed before a single division result is taken for use by the system, thus greatly reducing the effects of transient system noise spikes. Those of ordinary skill in the art will recognize that the number of samples taken prior to clearing the accumulators is a matter of design choice dictated by factors such as data acquisition rates, data processing rates etc.

It is preferable to provide additional filtering of the X and Y position data produced by division blocks 174 and 176 of the arithmetic unit 16 of FIG. 8. The filtering preferably occurs in between arithmetic unit 16 and motion and gesture units 18 and 20 of FIG. 1. The X and Y coordinates are separately filtered as independent numbers. Each filter is an averaging register computing a "running average" as is well-known in the art. When the finger's presence is first detected, the filter register is initialized with the current quotient. In subsequent samples, the new quotient is averaged with the filter register value to produce a new filter register value. In the presently preferred embodiment, the values are equally weighted in the average, though different weightings can be used to provide stronger or weaker filtering. The sequence of values in the filter register serve as the X and Y coordinates used by the motion and gesture units 18 and 20 of FIG. 1.

The system of the present invention is adaptable to changing conditions, such as component aging, changing capacitance due to humidity, and contamination of the touch surface, etc. In addition, the present invention effectively minimizes ambient noise. According to the present invention, these effects are taken into consideration in three ways. First, the offset values $O_N$ and $O_D$ are dynamically updated to accommodate changing conditions. Second, a servo-feedback circuit is provided to determine the bias voltage used to set the bias of the charge-integrator circuits 44-1 through 44-n. Third, as previously disclosed herein, the reference voltage points for $V_{max}$ and $V_{min}$ of the A/D converters are also dynamically altered to increase the signal to noise margin.

Figure 9:
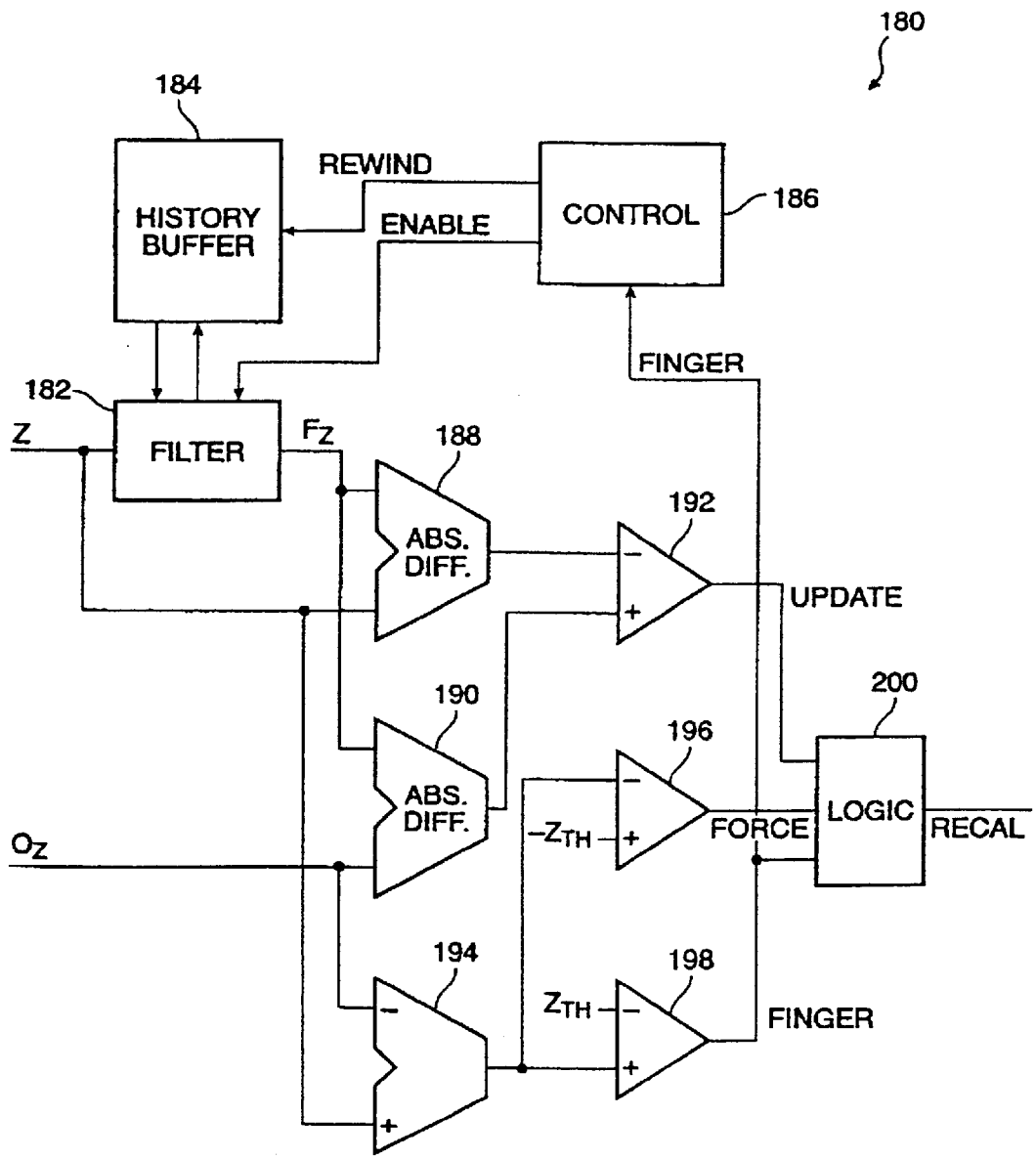
FIG. 9 is a block diagram of a calibration unit which may be used with the arithmetic unit of FIG. 8.

Referring now to FIG. 9, a block diagram of a calibration unit 150 which may be used with the arithmetic unit of FIG. 8 is presented. The calibration unit 150 executes an algorithm to establish the numerator and denominator offset values by attempting to determine when no finger or other conductive object is proximate to the touch sensor array 22.

As previously disclosed, the $O_N$ and $O_D$ offset values represent the baseline values of the array capacitances with no object present. These values are also updated according to the present invention since baseline levels which are too low or too high have the effect of shifting the apparent position of the object depending on the sign of the error. These values are established by selection of the values read when no object is present at the sensor array 22. Since there is no external way to "know" when no object is present at sensor array 22, an algorithm according to another aspect of the present invention is used to establish and dynamically update these offset values. When the calibration unit sees a Z value which appears typical of the Z values when no finger is present, it instructs the offset registers (158, 160, 162, and 164 of FIG. 8) to reload from the current values of the accumulators. According to a presently preferred embodiment of the invention, the decision to update the offset values is based on the behavior of the sensor array 22 in only one of the X or Y directions, but when the decision is made all four offsets ($O_{NX}$, $O_{DX}$, $O_{NY}$, and $O_{DY}$) are updated. In other embodiments of the invention, the decision to update may be individually made for each direction according to the criteria set forth herein.

The calibration algorithm works by monitoring changes in a selected one of the denominator accumulator values. According to the present invention, it has been observed that the sensitivity to changes in capacitance of one of the sets of conductive lines in the touch sensor array 22 is greater than the sensitivity to changes in capacitance of the other one of the sets of conductive lines in the touch sensor array 22. Experience suggests that the set of conductive lines having the greater sensitivity to capacitance changes is the one which is physically located above the conductive lines in the other direction and therefore closest to the touch surface of the sensor array 22. The upper set of conductive lines tends to partially shield the lower set of conductive lines from capacitive changes occurring above the surface of the sensor array 22.

The finger pressure is obtained by summing the capacitances measured on the sense lines. This value is already present in the denominator accumulator after subtracting the offset $O_D$. A finger is present if the pressure exceeds a suitable threshold value. This threshold may be chosen experimentally and is a function of surface material and circuit timing. The threshold may be adjusted to suit the tastes of the individual user.

The pressure reported by the device is a simple function $f(X_D, Y_D)$ of the denominators for the X and Y directions as implemented in block 178 of FIG. 8. Possible functions include choosing one preferred denominator value, or summing the denominators. In a presently preferred embodiment, the smaller of the two denominators is chosen. This choice has the desirable effect of causing the pressure to go below the threshold if the finger moves slightly off the edge of the pad, where the X sensors are producing valid data, but the Y sensors are not, or vise versa. This acts as an electronic bezel which can take the place of a mechanical bezel at the periphery of the sensor area.

In the example of FIG. 8, the Y denominator is chosen for monitoring because it is the most sensitive. The chosen denominator is referred to as Z for the purposes of the calibration algorithm. The current saved offset value for this denominator is referred to as $O_Z$.

The goal of the calibration algorithm is to track gradual variations in the resting Z level while making sure not to calibrate to the finger, nor to calibrate to instantaneous spikes arising from noise. As will be apparent to those of ordinary skill in the art from the following disclosure, the calibration algorithm could be implemented in digital or analog hardware, or in software. In a current embodiment actually tested by the inventors, it is implemented in software.

As Z values arrive in the calibration unit, they are passed through filter 182. History buffer 184, which operates in conjunction with filter 182, keeps a "running average" of recent Z values. When a new Z value arrives, the current running average $F_Z$ is updated according to the formula:

$$newF_Z = \alpha(oldF_Z) + (1-\alpha)Z \qquad [\text{Eq. 7}]$$

where $\alpha$ is a constant factor between 0 and 1 and typically close to 1 and Z is the current Z value. In the preferred embodiment, alpha is approximately 0.95. The intention is for $F_Z$ to change slowly enough to follow gradual variations, without being greatly affected by short perturbations in Z.

The filter 182 receives a signal ENABLE from control unit 186. The running average $F_Z$ is updated based on new Z values only when ENABLE is asserted. If ENABLE is deasserted, $F_Z$ remains constant and is unaffected by current Z.

The history buffer 184 records the several most recent values of $F_Z$. In the present embodiment, the history buffer records the two previous $F_Z$ values. The history buffer might be implemented as a shift register, circular queue, or analog delay line. When the history buffer receives a REWIND signal from control unit 186, it restores the current running average $F_Z$ to the oldest saved value. It is as if the filter 182 were "retroactively" disabled for an amount of time corresponding to the depth of the history buffer. The purpose of the history buffer is to permit such retroactive disabling.

The current running average $F_Z$ is compared against the current Z value and the current offset $O_Z$ by absolute difference units 188 and 190, and comparator 192. Absolute difference unit 188 subtracts the values Z and $F_Z$ and outputs the absolute value of their difference. Absolute difference unit 190 subtracts the values $O_Z$ and $F_Z$ and outputs the absolute value of their difference. Comparator 192 asserts the UPDATE signal if the output of absolute difference unit 188 is less than the output of absolute difference unit 190, i.e., if $F_Z$ is closer to Z than it is to $O_Z$. The UPDATE signal will tend to be asserted when the mean value of Z shifts to a new resting level. It will tend not to be asserted when Z makes a brief excursion away from its normal resting level. The filter constant a determines the length of an excursion which will be considered "brief" for this purpose.

Subtractor unit 194 is a simple subtractor that computes the signed difference between Z and $O_Z$. This subtractor is actually redundant with subtractor 172 in FIG. 8, and so may be merged with it in the actual implementation. The output $C_Z$ of this subtractor is the calibrated Z value, an estimate of the finger pressure. This pressure value is compared against a positive and negative Z threshold by comparators 196 and 198. These thresholds are shown as $Z_{TH}$ and $-Z_{TH}$, although they are not actually required to be equal in magnitude.

If pressure signal $C_Z$ is greater than $Z_{TH}$, the signal FINGER is asserted indicating the possible presence of a finger. The $Z_{TH}$ threshold used by the calibration unit is similar to that used by the rest of the system to detect the presence of the finger, or it may have a different value. In the present embodiment, the calibration $Z_{TH}$ is set somewhat lower than the main $Z_{TH}$ to ensure that the calibration unit makes a conservative choice about the presence of a finger.

If pressure signal $C_Z$ is less than $-Z_{TH}$, the signal FORCE is asserted. Since $O_Z$ is meant to be equal to the resting value of Z with no finger present, and a finger can only increase the sensor capacitance and thus the value of Z, a largely negative $C_Z$ implies that the device must have incorrectly calibrated itself to a finger, which has just been removed. Calibration logic 200 uses this fact to force a recalibration now that the finger is no longer present.

Control logic 186 is responsible for preventing running average $F_Z$ from being influenced by Z values that occur when a finger is present. Output ENABLE is generally off when the FINGER signal is true, and on when the FINGER signal is false. However, when FINGER transitions from false to true, the control logic also pulses the REWIND signal. When FINGER transitions from true to false, the control logic waits a short amount of time (comparable to the depth of the history buffer) before asserting ENABLE. Thus, the running average is prevented from following Z whenever a finger is present, as well as for a short time before and after the finger is present.

Calibration logic 200 produces signal RECAL from the outputs of the three comparators 192, 196, and 198. When RECAL is asserted, the offset registers $O_N$ and $O_D$ will be reloaded from the current accumulator values. RECAL is produced from the following logic equation:

RECAL=FORCE or (UPDATE and not FINGER). [Eq. 8]

In addition, calibration logic 200 arranges to assert RECAL once when the system is first initialized, possibly after a brief period to wait for the charge integrators and other circuits to stabilize.

From the descriptions of control logic 186 and calibration logic 200, it will be apparent to those of ordinary skill in the art that these blocks can be readily configured using conventional logic as a matter of simple and routine logic design.

It should be obvious to any person of ordinary skill in the art that the calibration algorithm described is not specific to the particular system of charge integrators and accumulators of the current invention. Rather, it could be employed in any touch sensor which produces proximity or pressure data in which it is desired to maintain a calibration point reflecting the state of the sensor when no finger or spurious noise is present.

Figure 10:
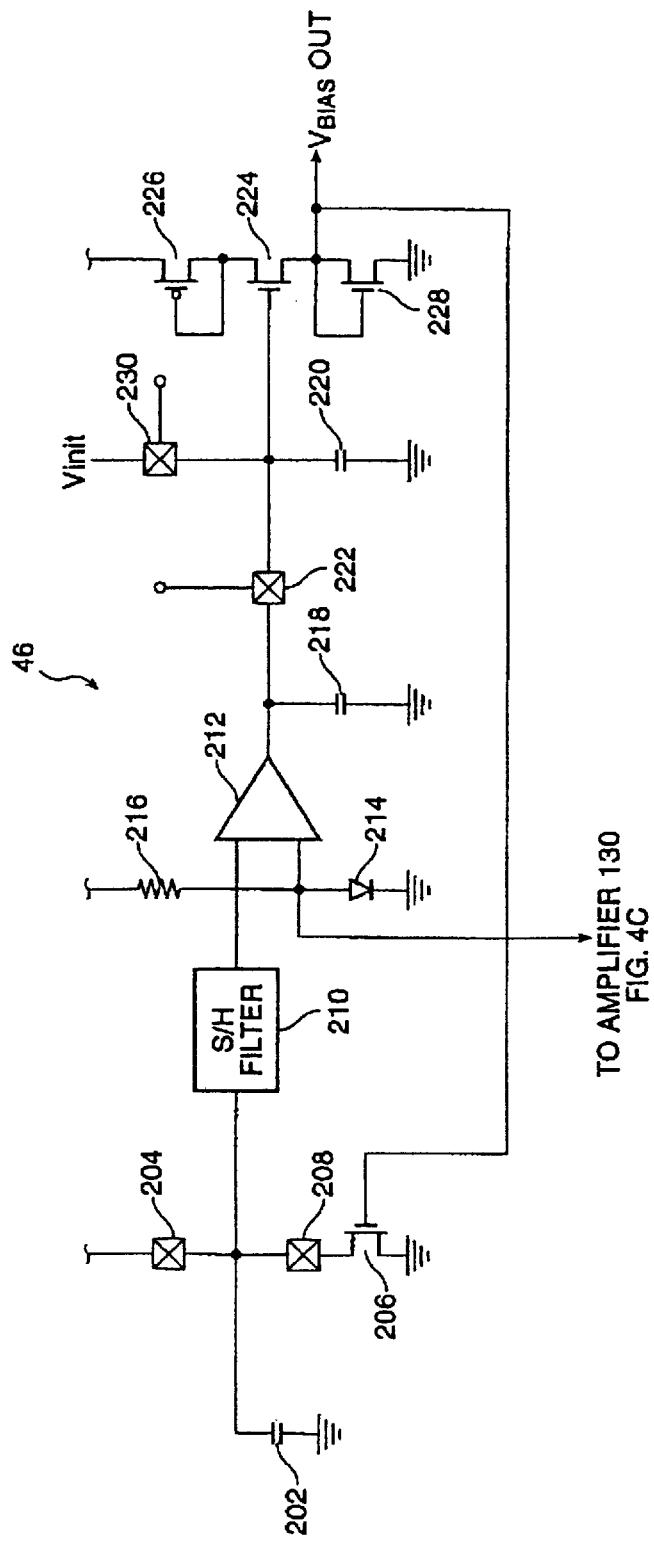
FIG. 10 is a schematic diagram of a bias voltage generating circuit useful in the present invention.

Referring now to FIG. 10, a bias voltage generating circuit 46 useful in the present invention is shown in schematic diagram form. According to a presently preferred embodiment of the invention, all of the bias transistors 108 (FIG. 4b) of charge integrator circuits 44-1 through 44-n have their gates connected to a single source of bias voltage, although persons of ordinary skill in the art recognize that other arrangements are possible. There are a number of ways in which to generate the bias voltage required by charge integrator circuits 44-1 through 4-n.

As may be seen from an examination of FIG. 10, the bias voltage generating circuit 46 is an overdamped servo system. A reference source which approximates the current source function of a typical one of the charge integrator circuits 44-1 through 44-n includes a capacitor 202 having one of its plates grounded. The other one of its plates is connected to the $V_{DD}$ power supply through a first pass gate 204 and to a current source transistor 206 through a second passgate 208. A filter circuit 210, identical to the filter circuits 48-1 through 48-n and controlled by the same signal as filter circuits 48-1 through 48-n is connected to sample the voltage on capacitor 202 in the same manner that the filter-and-sample/hold circuits 48-1 through 48-n sample the voltages on the sensor conductor capacitances in the sensor array 22.

The output of filter circuit 210 is fed to the non-inverting input of a weak transconductance amplifier 212, having a bias current in the range of from about 0.1–0.2 $\mu$A. The inverting input of the transconductance amplifier 212 is connected to a fixed voltage of about 1 volt generated, for example, by diode 214 and resistor 216. The common node of the anode of diode 214 and resistor 216 is used to drive the inverting input of transconductance amplifier 130 of FIG. 4c which servoes node 128 of the circuit of FIG. 4c to the proper voltage during the discharge portion of the capacitance measurement cycle. This common node is selected because it is the node that ultimately sets the voltage to which the conductive lines move during Axis 1 operation of the charge integrator circuits of FIGS. 4a and 4b.

The output of transconductance amplifier 212 is shunted by capacitor 218 and also by capacitor 220 through passgate 222. Capacitor 220 is chosen to be much larger than capacitor 218. In a typical embodiment of the present invention, capacitor 218 may be about 0.2 pF and capacitor 220 may be about 10 pF.

Capacitor 220 is connected to the gate of N-Channel MOS transistor 224, which has its drain connected to the drain and gate of P-Channel MOS transistor 226 and its source connected to the drain and gate of N-Channel MOS transistor

228. The source of P-Channel MOS transistor 226 is connected to $V_{DD}$ and the source of N-Channel MOS transistor 228 is connected to ground. The common drain connection of transistors 224 and 228 is the bias voltage output node.

An optional passgate 230 may be connected between a fixed voltage source (e.g., about 2 volts) and capacitor 220. Passgate 230 may be used to initialize the bias generating circuit 46 on startup by charging capacitor 220 to the fixed voltage.

During each sample period, the filter circuit 210 takes a new sample. If the new sample differs from the previous sample, the output voltage of transconductance amplifier 212 will change and start to charge or discharge capacitor 218 to a new voltage. Passgate 222 is switched on for a short time (i.e., about 1 μsec) and the voltages on capacitors 218 and 220 try to average themselves. Due to the large size difference between capacitors 218 and 220, capacitor 218 cannot supply enough charge to equalize the voltage during the period when passgate 222 is open. This arrangement prevents large changes in bias voltage from cycle to cycle.

Capacitor 202 should look as much as possible like one of the sensor array channels and has a value equal to the background capacitance of a typical sensor line, (i.e., with no object proximate or present capacitance component). Capacitor 202 may be formed in several ways. Capacitor 202 may comprise an extra sensor line in a part of the sensor array, configured to approximate one of the active sensor lines but shielded from finger capacitance by a ground plane, etc. Alternately, capacitor 202 may be a capacitor formed in the integrated circuit or connected thereto and having a value selected to match that of a typical sensor line. In this respect, the signal source comprising capacitor 202 and filter circuit 210 is somewhat like the circuitry for generating the $V_{max}$ and $V_{min}$ reference voltages, in that it mimics a typical sensor line.

As another alternative, one of the actual sensor lines may be employed to set the bias voltage. The measured voltage on the two end-point sensor lines may be compared and the one having the lowest value may be selected on the theory that, if a finger or other object is proximate to the sensor array, it will not be present at sensor lines located at the opposite edges of the array.

The increased sensitivity of the touch sensor system of the present invention allows for a lighter input finger touch which makes it easy for human use. Increased sensitivity also makes it easier to use other input objects, like pen styli, etc. Additionally, this sensitivity allows for a tradeoff against a thicker protective layer, or different materials, which both can allow for lower manufacturing costs.

Greater noise rejection allows for greater flexibility in use and reduced sensitivity to spurious noise problems. Two techniques are employed which allow derivation of the most noise-rejection benefit.

Due to the drive and sense techniques employed in the present invention, the data acquisition rate has been increased by about a factor of 30 over the prior art. This offers several obvious side effects. First, for the same level of signal processing, the circuitry can be turned off most of the time and reduce power consumption by roughly a factor of 30 in the analog section of the design. Second, since more data is available, more signal processing, such as filtering and gesture recognition, can be performed.

The sensor electronic circuit employed in the present invention is very robust and calibrates out process and systematic errors. It will process the capacitive information from the sensor and provide digital information to an external device, for example, a microprocessor.

Because of the unique physical features of the present invention, there are several ergonomically interesting applications that were not previously possible. Presently a mouse or trackball is not physically convenient to use on portable computers. The present invention provides a very convenient and easy-to-use cursor position solution that replaces those devices.

In mouse-type applications, the sensor of the present invention may be placed in a convenient location, e.g., below the "space bar" key in a portable computer. When placed in this location, the thumb of the user may be used as the position pointer on the sensor to control the cursor position on the computer screen. The cursor may then be moved without the need for the user's fingers to leave the keyboard. Ergonomically, this is similar to the concept of the Macintosh Power Book with its trackball, however the present invention provides a significant advantage in size over the trackball. Extensions of this basic idea are possible in that two sensors could be placed below the "space bar" key for even more feature control.

The computer display with its cursor feedback is one small example of a very general area of application where a display could be a field of lights or LEDs, an LCD display, or a CRT. Examples include touch controls on laboratory equipment where present equipment uses a knob/button/touch screen combination. Because of the articulating ability of this interface, one or more of those inputs could be combined into one of the inputs described with respect to the present invention.

Consumer Electronic Equipment (stereos, graphic equalizers, mixers) applications often utilize significant front panel surface area for slide potentiometers because variable control is needed. The present invention can provide such control in one small touch pad location. As Electronic Home Systems become more common, denser and more powerful human interface is needed. The sensor technology of the present invention permits a very dense control panel. Hand-held TV/VCR/Stereo controls could be ergonomically formed and allow for more powerful features if this sensor technology is used.

The sensor of the present invention can be conformed to any surface and can be made to detect multiple touching points, making possible a more powerful joystick. The unique pressure detection ability of the sensor technology of the present invention is also key to this application. Computer games, "remote" controls (hobby electronics, planes), and machine tool controls are a few examples of applications which would benefit from the sensor technology of the present invention.

Musical keyboards (synthesizers, electric pianos) require velocity sensitive keys which can be provided by the pressure sensing ability of this sensor. There are also pitch bending controls, and other slide switches that could be replaced with this technology. An even more unique application comprises a musical instrument that creates notes as a function of the position and pressure of the hands and fingers in a very articulate 3-d interface.

The sensor technology of the present invention can best detect any conducting material pressing against it. By adding a compressible insulating layer covered by a layer of conductive material on top of the sensor the sensor of the present invention may also indirectly detect pressure from any object being handled, regardless of its electrical conductivity.

Because of the amount of information available from this sensor it will serve very well as an input device to virtual reality machines. It is easy to envision a construction that allows position-monitoring in three dimensions and some degree of response (pressure) to actions.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An object proximity sensor, including:
    a capacitive touch-sensitive transducer including row conductive lines disposed in a first direction insulated from column conductive lines disposed in a second direction generally perpendicular to the first direction to form a matrix, and an insulating layer disposed over the matrix and having a thickness selected to achieve significant capacitive coupling between an object placed on its surface and the matrix;
    means for first driving each of said row conductive lines to a fixed voltage and then for simultaneously injecting a known amount of charge onto each of said row conductive lines, and then sensing for each row conductive line a row-sense voltage created by said known amount of charge injected onto each of said row conductive lines, and, simultaneous with injecting said known amount of charge, changing the voltage on all of said column conductive lines in the same direction as said row-sense voltage of said each row conductive line by an amount no greater than about twice the difference between said fixed voltage and an average of all row-sense voltages in said transducer;
    means for first driving each of said column conductive lines to a fixed voltage and then for simultaneously injecting a known amount of charge onto each of said column conductive lines, and then sensing for each column conductive line a column-sense voltage created by said known amount of charge injected onto each of said column conductive lines, and, simultaneous with injecting said known amount of charge, changing the voltage on all of said row conductive lines in the same direction as said column-sense voltage of said each column conductive line by an amount no greater than about twice the difference between said fixed voltage and an average of all column-sense voltages in said transducer; and
    means for producing a set of object-sensed electrical signals related to all of said row-sense voltages and said all of said column-sense voltages.

2. The object proximity sensor of claim 1 wherein said row conductive lines are disposed on a first face of a substrate and said column conductive lines are disposed on a second face of said substrate opposite said first face.

3. The object proximity sensor of claim 2 wherein said substrate is flexible.

4. The object proximity sensor of claim 1, further including:
    means for sensing an minimum background capacitance from among said row conductive lines, for sensing an minimum background capacitance from among said column conductive lines, for producing a set of minimum background electrical signals related thereto; and
    means for subtracting said set of minimum background electrical signals from said set of object-sensed electrical signals.

5. The object proximity sensor of claim 1, further including:
    means for producing a set of average background electrical signals related to an average background capacitance from among said row conductive lines and an average background capacitance from among said column conductive lines; and
    means for subtracting said set of average background electrical signals from said set of object-sensed electrical signals.

6. An object proximity sensor, including:
    a capacitive touch-sensitive transducer including row conductive lines disposed in a first direction insulated from column conductive lines disposed in a second direction generally perpendicular to the first direction to form a matrix, and an insulating layer disposed over the matrix and having a thickness selected to achieve significant capacitive coupling between an object placed on its surface and the matrix;
    means for first driving each of said row conductive lines to a fixed voltage and then for simultaneously removing a known amount of charge from each of said row conductive lines, and then sensing for each row conductive line a row-sense voltage created by removal of said known amount of charge onto each of said row conductive lines, and, simultaneous with removing said known amount of charge, changing the voltage on all of said column conductive lines in the same direction as said row-sense voltage of said each row conductive line by an amount no greater than about twice the difference between said fixed voltage and an average of all row-sense voltages in said transducer;
    means for first driving each of said column conductive lies to a fixed voltage and then for simultaneously removing a known amount of charge from each of said column conductive lines, and then sensing for each column conductive line a column-sense voltage created by removal of said known amount of charge onto each of said column conductive lines, and, simultaneous with removing said known amount of charge, changing the voltage on all of said row conductive lines in the same direction as said column-sense voltage of said each column conductive line by an amount no greater than about twice the difference between said fixed voltage and an average of all column-sense voltages in said transducer, and
    means for producing a set of object-sensed electrical signals related to all of said row-sense voltages and said all of said column-sense voltages.

7. The object proximity sensor of claim 6 wherein said row conductive lines are disposed on a first face of a substrate and said column conductive lines are disposed on a second face of said substrate opposite said first face.

8. The object proximity sensor of claim 7 wherein said substrate is flexible.

9. The object proximity sensor of claim 6, further including:
    means for sensing an minimum background capacitance from among said row conductive lines, for sensing an minimum background capacitance from among said column conductive lines, and for producing a set of minimum background electrical signals related thereto; and
    means for subtracting said set of minimum background electrical signals from said set of object-sensed electrical signals.

10. The object proximity sensor of claim 6, further including:

means for producing a set of average background electrical signals related to an average background capacitance from among said row conductive lines and to an average background capacitance from among said column conductive lines; and means for subtracting said set of average background electrical signals from said set of object-sensed electrical signals.

11. An object proximity sensor, including:

a capacitive touch-sensitive transducer including row conductive lines disposed in a first direction insulated from column conductive lines disposed in a second direction generally perpendicular to the first direction to form a matrix, and an insulating layer disposed over the matrix and having a thickness selected to achieve significant capacitive coupling between an object placed on its surface and the matrix;

means for first driving each of said row conductive lines to a first fixed voltage and then for simultaneously injecting a known amount of charge onto each of said row conductive lines, and then sensing a set of first row-sense voltages created by said known amount of charge injected onto each of said row conductive lines and, simultaneous with injecting said known amount of charge, changing the voltage on all of said column conductive lines in the same direction as said first row-sense voltages by an amount no greater than about twice the difference between said first fixed voltage and an average of all first row-sense voltages in said transducer;

means for first driving each of said column conductive lines to said first fixed voltage and then for simultaneously injecting a known amount of charge onto each of said column conductive lines, and then sensing a set of first column-sense voltages created by said known amount of charge injected onto each of said column conductive lines and, simultaneous with injecting said known amount of charge, changing the voltage on all of said column conductive lines in the same direction as said first column-sense voltages by an amount no greater than about twice the difference between said first fixed voltage and an average of all first column-sense voltages in said transducer;

means for first driving each of said row conductive lines to a second fixed voltage and then for simultaneously removing a known amount of charge from each of said row conductive lines, and then sensing a set of second row-sense voltages created by removal of said known amount of charge onto each of said row conductive lines and, simultaneous with removing said known amount of charge, changing the voltage on all of said column conductive lines in the same direction as said second row-sense voltages by an amount no great than about twice the difference between said second fixed voltage and an average of all second row-sense voltages in said transducer;

means for first driving each of said column conductive lines to said second fixed voltage and then for simultaneously removing a known amount of charge from each of said column conductive lines, and then sensing a set of second column-sense voltage created by removal of said known amount of charge onto each of said column conductive lines and, simultaneous with removing said known amount of charge, changing the voltage on all of said row conductive lines in the same direction as said second column-sense voltages by an amount no greater than about twice the difference between said second fixed voltage and an average of all second column-sense voltages in said transducer;

means for averaging each pair of said first row-sense voltages and said second row-sense voltages to produce a set of average row-sense voltages and for averaging each pair of said first column-sense voltages and said second column-sense voltages to produce a set of average column-sense voltages; and means for producing a set of object-sensed electrical signals related to said set of average row-sense voltages and said set of average column-sense voltages.

12. The object proximity sensor of claim 11 wherein said row conductive lines are disposed on a first face of a substrate and said column conductive lines are disposed on a second face of said substrate opposite said first face.

13. The object proximity sensor of claim 12 wherein said substrate is flexible.

14. The object proximity sensor of claim 11, further including:

means for sensing an minimum background capacitance from among said row conductive lines, for sensing an minimum background capacitance from among said column conductive lines, and for producing a set of minimum background electrical signals related thereto; and means for subtracting said set of minimum background electrical signals from said set of object-sensed electrical signals.

15. The object proximity sensor of claim 11, further including:

means for producing a set of average background electrical signals related to an average background capacitance from among said row conductive lines and to an average background capacitance from among said column conductive lines; and means for subtracting said set of average background electrical signals from said set of object-sensed electrical signals.

16. A method for operating a capacitive touch-sensitive transducer including row conductive lines disposed in a first direction insulated from column conductive lines disposed in a second direction generally perpendicular to the first direction to form a matrix, the row conductive lines and the column conductive lines, and an insulating layer disposed over the matrix and having a thickness selected to achieve significant capacitive coupling between an object placed on its surface and the matrix, the method comprising the steps of;

first driving each of said row conductive lines to a fixed voltage and then simultaneously injecting a known amount of charge onto each of said row conductive lines, and then sensing for each row conductive line a row-sense voltage created by said known amount of charge injected onto each of said row conductive lines while simultaneously changing the voltage on all of said column conductive lines in the same direction as said row-sense voltage of said each row conductive line by an amount no greater than about twice the difference between said fixed voltage and an average of all row-sense voltages in said transducer;

first driving each of said column conductive lines to a fixed voltage and then simultaneously injecting a known amount of charge onto each of said column conductive lines, and then sensing for each column conductive line a column-sense voltage created by said known amount of charge injected onto each of said column conductive lines while simultaneously driving all of said row conductive lines to a fixed voltage having the same polarity as said column-sense voltage of said each column conductive line by an amount no greater than about twice the difference between said fixed voltage and an average of all column-sense voltages in said transducer; and producing a set of object-sensed electrical signals related to all of said row-sense voltages and said all of said column-sense voltages.

17. An object proximity sensor, including:

a capacitive touch-sensitive transducer including row conductive lines disposed in a first direction insulated from column conductive lines disposed in a second direction generally perpendicular to the first direction to form a matrix, and an insulating layer disposed over the matrix and having a thickness selected to achieve significant capacitive coupling between an object placed on its surface and the matrix;

means for first driving each of said row conductive lines to a fixed voltage and then for simultaneously altering the amount of charge on each of said row conductive lines by a known amount, and then sensing for each row conductive line a row-sense voltage created by altering said charge, and, simultaneous with altering said charge, changing the voltage on all of said column conductive lines in the same direction that altering said charge moves said row-sense voltage of said each row conductive line by an amount no greater than about twice the difference between said fixed voltage and an average of all row-sense voltages in said transducer;

means for first driving each of said column conductive lines to a fixed voltage and then for simultaneously altering the amount of charge on each of said column conductive lines by a known amount, and then sensing for each column conductive line a column-sense voltage created by altering said charge, and, simultaneous with altering said charge, changing the voltage on all of said row conductive lines in the same direction that altering said charge moves said column-sense voltage of said each column conductive line by an amount no greater than about twice the difference between said fixed voltage and an average of all column-sense voltages in said transducer; and means for producing a set of object-sensed electrical signals related to all of said row-sense voltages and said all of said column-sense voltages.

18. The object proximity sensor of claim 17 wherein said row conductive lines are disposed on a first face of a substrate and said column conductive lines are disposed on a second face of said substrate opposite said first face.

19. The object proximity sensor of claim 18 wherein said substrate is flexible.

20. The object proximity sensor of claim 17, further including:

means for sensing an minimum background capacitance from among said row conductive lines, for sensing an minimum background capacitance from among said column conductive lines, for producing a set of minimum background electrical signals related thereto; and means for subtracting said set of minimum background electrical signals from said set of object-sensed electrical signals.

21. The object proximity sensor of claim 17, further including:

means for producing a set of average background electrical signals related to an average background capacitance from among said row conductive lines and an average background capacitance from among said column conductive lines; and means for subtracting said set of average background electrical signals from said set of object-sensed electrical signals.

* * * * *

UNITED STATES PATENT AND TRADEMARK OFFICE
CERTIFICATE OF CORRECTION

PATENT NO. : 5,861,583
DATED : January 19, 1999
INVENTOR(S) : Richard Schediwy, Jeffrey Orion Pritchard, Ting Kao, Timothy P. Allen, and John Platt It is certified that error appears in the above-identified patent and that said Letters Patent is hereby corrected as shown below:

In ABSTRACT, line 12, "injected" should be read as --injecting--.

Column 13, line 45, "AID" should be read as --A/D--.

Column 19, line 66, "multiplexer 130" should be read as --multiplexer 140--.

Column 25, line 24, "constant a" should be read as --constant $\alpha$--.

Signed and Sealed this

Twenty-eighth Day of September, 1999

Attest:

Q. TODD DICKINSON

*Attesting Officer*  Acting Commissioner of Patents and Trademarks